United States Patent
Ishii et al.

(10) Patent No.: US 8,504,072 B2
(45) Date of Patent: Aug. 6, 2013

(54) RADIO COMMUNICATION TERMINAL, RADIO COMMUNICATION BASE STATION DEVICE, AND RADIO COMMUNICATION METHOD

(75) Inventors: Yoshikazu Ishii, Kanagawa (JP);
Takeshi Kanazawa, Kanagawa (JP);
Akito Fukui, Kanagawa (JP)

(73) Assignee: Panasonic Corporation, Osaka (JP)

( * ) Notice: Subject to any disclaimer, the term of this patent is extended or adjusted under 35 U.S.C. 154(b) by 410 days.

(21) Appl. No.: 12/675,378

(22) PCT Filed: Aug. 29, 2008

(86) PCT No.: PCT/JP2008/002370
§ 371 (c)(1),
(2), (4) Date: Feb. 25, 2010

(87) PCT Pub. No.: WO2009/028209
PCT Pub. Date: Mar. 5, 2009

(65) Prior Publication Data
US 2010/0227627 A1   Sep. 9, 2010

(30) Foreign Application Priority Data

Aug. 31, 2007  (JP) .................................. 2007-227158
Mar. 5, 2008  (JP) .................................. 2008-055329

(51) Int. Cl.
*H04W 24/00* (2009.01)
*H04M 1/66* (2006.01)
*H04W 4/00* (2009.01)
*H04L 12/16* (2006.01)

(52) U.S. Cl.
USPC ......... 455/456.2; 455/411; 370/338; 370/259

(58) Field of Classification Search
USPC ...................................................... 455/456.2
See application file for complete search history.

(56) References Cited

U.S. PATENT DOCUMENTS

| | | | | |
|---|---|---|---|---|
| 2007/0140185 A1* | 6/2007 | Garg et al. | | 370/338 |
| 2007/0232321 A1* | 10/2007 | Casati et al. | | 455/456.1 |
| 2007/0275707 A1* | 11/2007 | Kwak et al. | | 455/414.2 |
| 2009/0061821 A1* | 3/2009 | Chen et al. | | 455/411 |
| 2009/0122727 A1* | 5/2009 | Gan et al. | | 370/259 |

FOREIGN PATENT DOCUMENTS

| | | |
|---|---|---|
| FR | EP 1916857 | * 10/2006 |
| JP | 06-327048 | 11/1994 |
| WO | 2007/040449 | 4/2007 |

OTHER PUBLICATIONS

International Search Report dated Nov. 18, 2008.
3GPP TSG RAN WG3 Meeting #54 R3-061857, Vodafone Group, "Implementation Specific O&M for LTE," Nov. 6, 2006, pp. 1-3.

(Continued)

*Primary Examiner* — Patrick N. Edouard
*Assistant Examiner* — Timothy Pham
(74) *Attorney, Agent, or Firm* — Dickinson Wright PLLC

(57) ABSTRACT

A radio communication terminal, a radio communication base station device, and radio communication method enabling lightening the paging load in a mobile communication system including macro cells and femto cells. A reception level measuring section (144) of a UE (104) measures the reception level of a femto cell. If a judging section (146) judges that the measured reception level is over a level which is the sum of a threshold and an offset value, the judging section (146) requests an MME (101) to change a multi TA registration to a single TA registration and carries out a change to one tracking area registration.

3 Claims, 36 Drawing Sheets

OTHER PUBLICATIONS

3GPP TSG RAN WG3 Meeting #57 R3-071589, Mitsubishi Electric, "EUTRAN topology in support of Home eNodeBs," Aug. 20, 2007, pp. 1-4.

3GPP TSG RAN WG3 Meeting #55 R3-070143, Ericsson, "Tracking Area Concept," Feb. 12, 2007, pp. 1-5.

3GPP TSG RAN WG3 Meeting #54 R3-061786, Ericsson, "Evaluation of tracking area concept alternatives," Nov. 6, 2006, pp. 1-6.

Chinese Office Action dated Jul. 3, 2012.

* cited by examiner

| RECEPTION LEVEL OF FEMTO CELL | MEASUREMENT REPORT |
|---|---|
| CASE 1: FALLS BELOW THRESHOLD FOR SELECTING FEMTO CELL | SINCE QUALITY OF COMMUNICATION WITH FEMTO CELL DETERIORATES, REPORT RECEPTION LEVELS OF FEMTO CELL AND PERIPHERAL MACRO CELL TO NODE B TO URGE HANDOVER TO PERIPHERAL MACRO CELL |
| CASE 2: FALLS BELOW LEVEL OBTAINED BY ADDING OFFSET VALUE TO THRESHOLD FOR SELECTING FEMTO CELL | REPORT RECEPTION LEVEL AND REQUEST CONTINUATION OF MULTI-TA REGISTRATION |
| CASE 3: EXCEEDS LEVEL OBTAINED BY ADDING OFFSET VALUE TO THRESHOLD FOR SELECTING FEMTO CELL | REPORT RECEPTION LEVEL AND REQUEST SWITCHING TO SINGLE TA REGISTRATION |

FIG.20

RADIO COMMUNICATION TERMINAL, RADIO COMMUNICATION BASE STATION DEVICE, AND RADIO COMMUNICATION METHOD

TECHNICAL FIELD

The present invention relates to a radio communication terminal apparatus, radio communication base station apparatus and radio communication method.

BACKGROUND ART

With the use of increasingly wider bandwidths and higher data rates, mobile communication services in recent years are realizing multimedia services such as music and video images. Furthermore, in order to realize much faster data services, the 3GPP (3rd Generation Partnership Project), which is a mobile communication technology standards organization, is studying a mobile communication technology called "LTE (Long Term Evolution)" that realizes a data rate of 100 Mbps or higher. On the other hand, to respond to such a high-speed radio access network and accelerated adoption of IP technology for the network, expansions of a mobile network configuration and node functions (SAE: System Architecture Evolution) are under review.

Examples of techniques for managing movement of radio communication terminal apparatuses (hereinafter referred to as "UE") in a mobile communication system realized through LTE/SAE include a handover technique that manages movement of a UE carrying out data communication between cells and an idle mobility technique that manages movement of the UE in a waiting state (hereinafter referred to as "idle state") within a mobile communication system.

In idle mobility, a network manages the position of the UE in a unit called "tracking area" and the UE updates the tracking area (hereinafter referred to as "TAU: Tracking Area Update") to a radio communication mobility management apparatus (hereinafter referred to as "MME: Mobility Management Entity") on the network side every time a boundary of tracking areas is crossed, that is, every time the UE moves to the tracking area of a different tracking area identifier (hereinafter referred to as "TAI: Tracking Area Identifier"). Through this TAU, the network can manage the latest UE movement situation in tracking area units and can send a paging message for a call connection to the UE.

As the TAU method, a multi-TA registration scheme is adopted whereby a plurality of peripheral TAIs are assigned to one UE (see FIG. 1 and FIG. 2). This multi-TA registration scheme eliminates the necessity for a UE located on a tracking area boundary to perform TAU frequently, and can thereby reduce the signaling load originating from TAU (i.e. the load originating from signaling).

On the other hand, the next-generation mobile communication system is studying adoption of femto cell base stations (small-cell radio communication base station apparatuses) that cover small zone areas of several tens of meters (i.e. femto cells) such as a home, office or restaurant in addition to large cells or macro cells currently in operation. A femto cell base station under review in the 3GPP is designed to allow, when, for example, installed at a home, only restricted group members to have access such as limiting access to only family members of the home. Such a cell may be referred to as an "access-limited cell (CSG cell: Closed Service Group cell)."

Furthermore, a UE which is granted access is preferentially connected to a femto cell base station. That is, as shown in FIG. 3, when the UE enters the area of the femto cell base station, even if the UE can receive radio waves of a macro cell, the UE is preferentially connected to a small-cell radio communication base station apparatus.

Patent Document 1: Japanese Patent Publication No. 2907678

Non-Patent Document 1: 3GPP TSG RAN WG3 Document, R3-070143 "Tracking Area Concept"

DISCLOSURE OF INVENTION

Problems to be Solved by the Invention

However, according to the multi-TA registration scheme described in aforementioned Patent Document 1 and Non-Patent Document 1, that is, the scheme where a plurality of peripheral TAIs are assigned to one UE, the UE on a tracking area boundary need not perform TAU frequently, and can thereby reduce the signaling load caused by TAU (i.e. the load caused by signaling), but when this multi-TA registration scheme is applied to mobile communication systems including large zone macro cells and small zone femto cells, even if the UE is located in the femto cell area, the mobile communication systems need to broadcast a paging message to a plurality of peripheral large zone macro cells, resulting in a problem of increased paging load (i.e. the load caused by paging).

It is therefore an object of the present invention to provide a radio communication terminal apparatus, radio communication base station apparatus and radio communication method that reduce paging load in mobile communication systems including macro cells and femto cells.

Means for Solving the Problem

The radio communication terminal apparatus of the present invention adopts a configuration including a determining section that determines whether or not a currently connecting radio communication base station apparatus is a femto cell base station and a radio transmitting/receiving section that transmits a position management area update request signal that requests single tracking area registration when the currently connecting radio communication base station apparatus is determined to be a femto cell base station and the first call connection request signal is transmitted.

The radio communication base station apparatus of the present invention adopts a configuration including a reception level managing section that manages a reception level measured by a radio communication terminal apparatus and a control section that determines, after a communication end in the first active state of the connected radio communication terminal apparatus, whether or not to request single tracking area registration according to the reception level measured by the radio communication terminal apparatus in the active state and transmits a position management area update request signal that requests the single tracking area registration.

The radio communication method of the present invention includes a determining step of determining whether or not a currently connecting radio communication base station apparatus is a femto cell base station, a reception level measuring step of measuring a reception level of a signal transmitted from a radio communication base station apparatus and a transmitting/receiving step of transmitting a position management area update request signal that requests single tracking area registration when the currently connecting radio communication base station apparatus is determined to be a femto cell base station and the first call connection request signal is transmitted.

ADVANTAGEOUS EFFECTS OF INVENTION

The present invention can reduce the paging load in mobile communication systems including macro cells and femto cells.

BRIEF DESCRIPTION OF DRAWINGS

FIG. 20 is a diagram illustrating a method of reporting the reception level of a femto cell and measurement result to a node B;

BEST MODE FOR CARRYING OUT THE INVENTION

Hereinafter, embodiments of the present invention will be explained in detail with reference to the accompanying drawings. In the following embodiments, a small cell radio base station apparatus that provides a cell smaller than a macro cell will be described as a femto cell, but the small-cell radio communication base station apparatus may be a home cell that covers each home, an office cell that covers an office, a hot spot cell installed as a hot spot in a restaurant or the like, or of these cells, an access-limited cell (CSG cell: Closed Service Group cell) whose access is allowed only to restricted group members.

(Embodiment 1)

Figure 1:
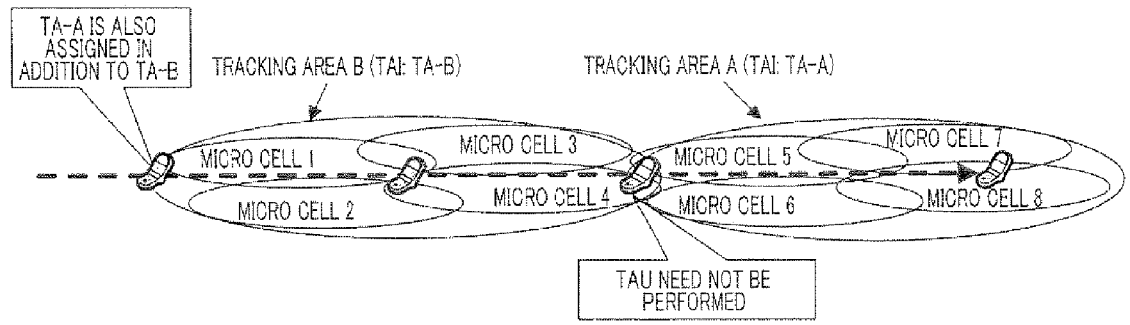
FIG. 1 is a diagram illustrating a multi-TA registration scheme whereby a plurality of peripheral TAIs are assigned to one UE.
Figure 2:
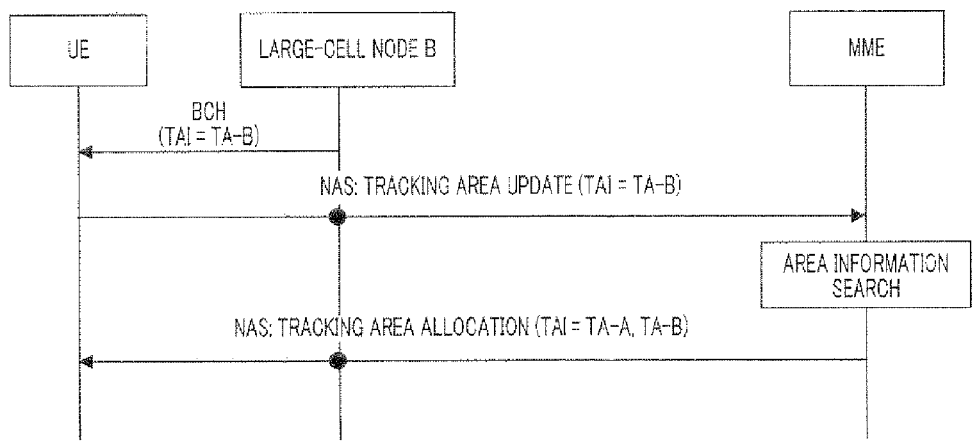
FIG. 2 is a sequence diagram illustrating steps in procedures of a multi-TA registration scheme whereby a plurality of peripheral TAIs are assigned to one UE.
Figure 3:
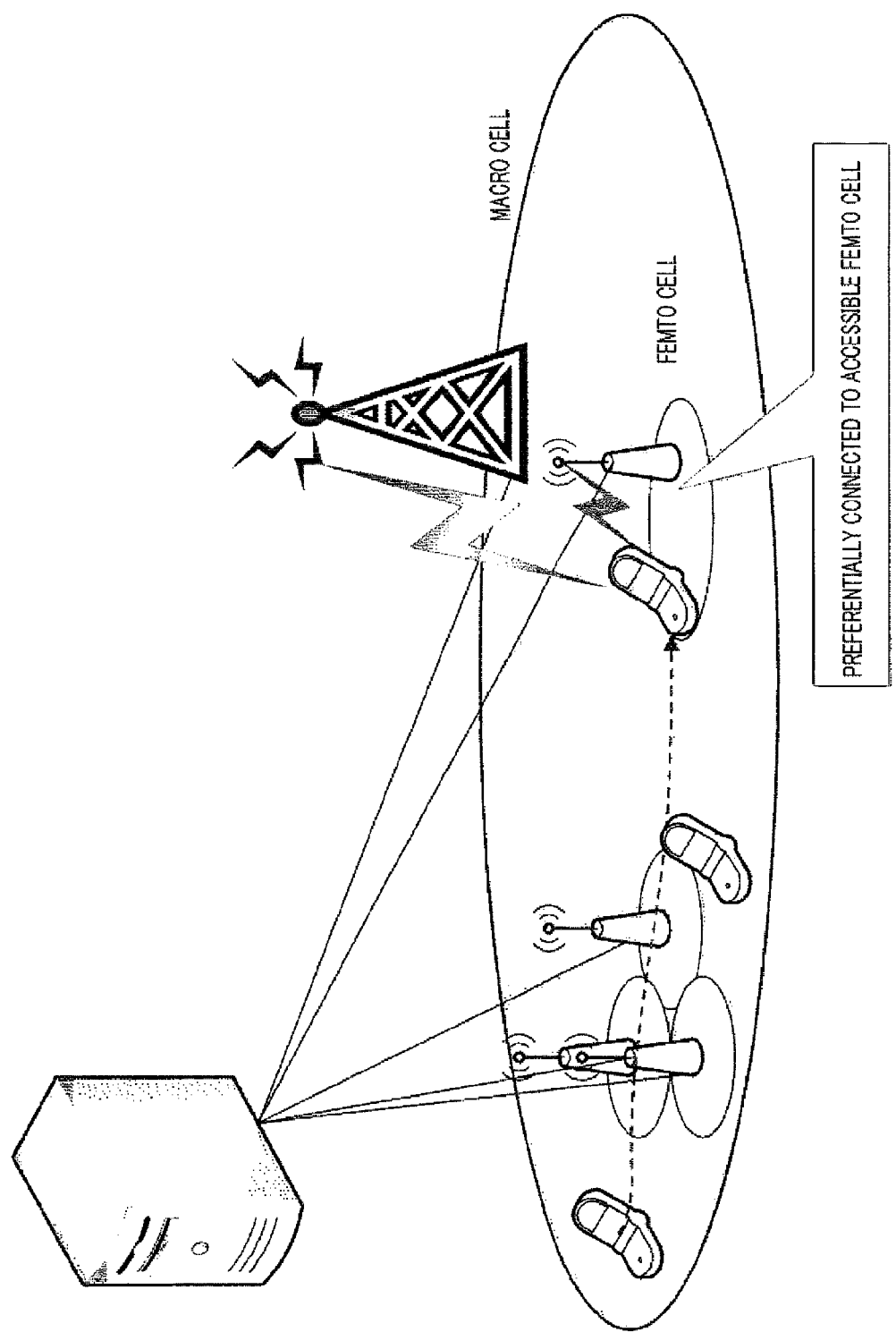
FIG. 3 is a diagram illustrating a femto cell.
Figure 4:
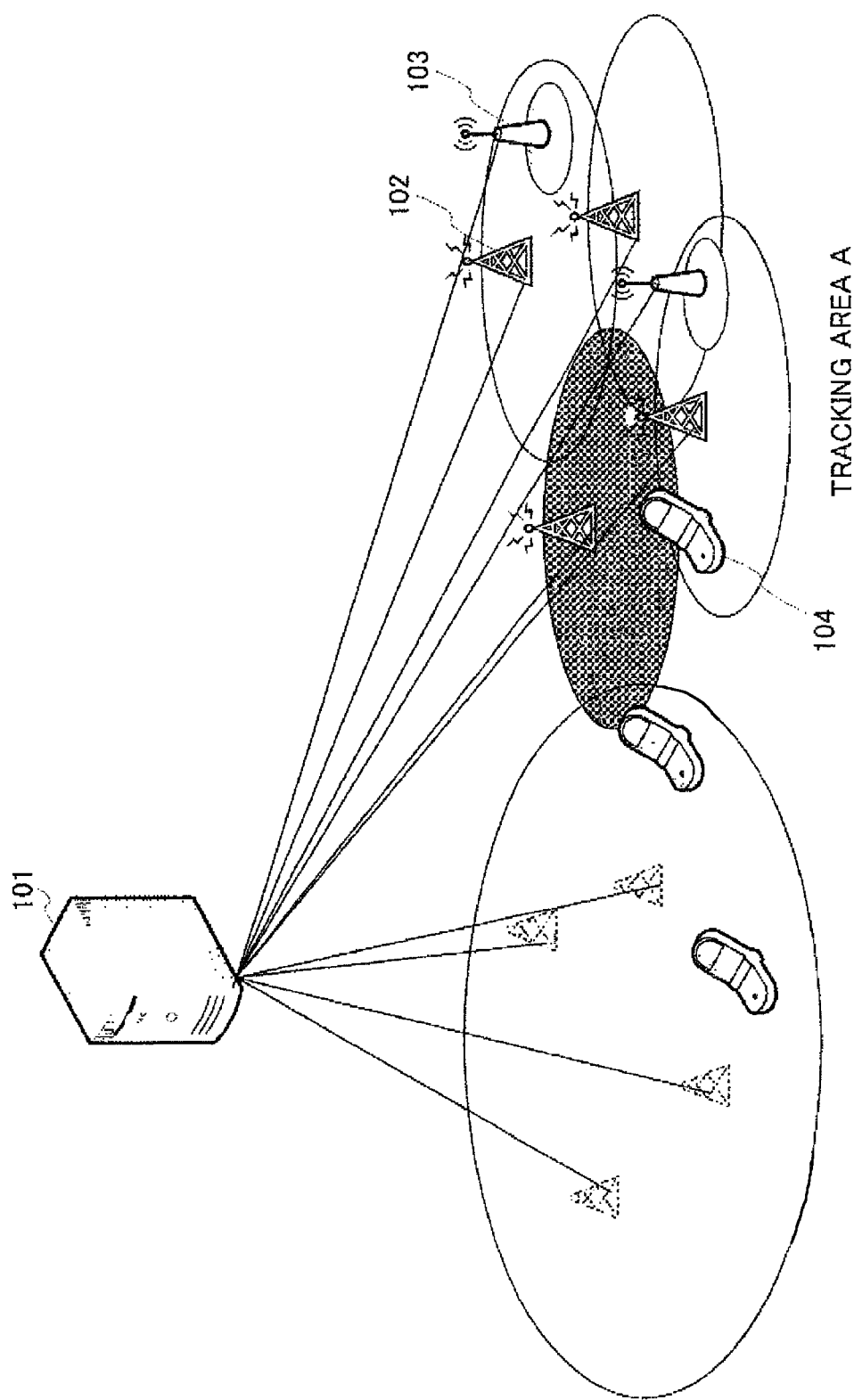
FIG. 4 is a diagram illustrating a configuration of a mobile communication system according to Embodiment 1 of the present invention.

FIG. 4 is a diagram illustrating a configuration of a mobile communication system according to Embodiment 1 of the present invention. As shown in FIG. 4, the mobile communication system according to Embodiment 1 of the present invention is provided with radio communication mobility management apparatus (hereinafter referred to as "MME") 101, large-cell radio communication base station apparatus (hereinafter referred to as "large-cell node B") 102, small-cell radio communication base station apparatus (hereinafter referred to as "small-cell node B") 103 and radio communication terminal apparatus (hereinafter referred to as "UE") 104.

MME 101 carries out mobility management of UEs. Large-cell node B 102 manages macro cell areas. Small-cell node B 103 manages femto cell areas. UE 104 is connected to large-cell node B 102 and small-cell node B 103 to carry out communication.

Here, a tracking area is formed of one or more macro cells as a unit for managing movement of UE 104 in an idle state. Furthermore, tracking area A, tracking area B and each femto cell form different tracking areas and are given different tracking area identifiers (hereinafter referred to as "TAI").

Figure 5:
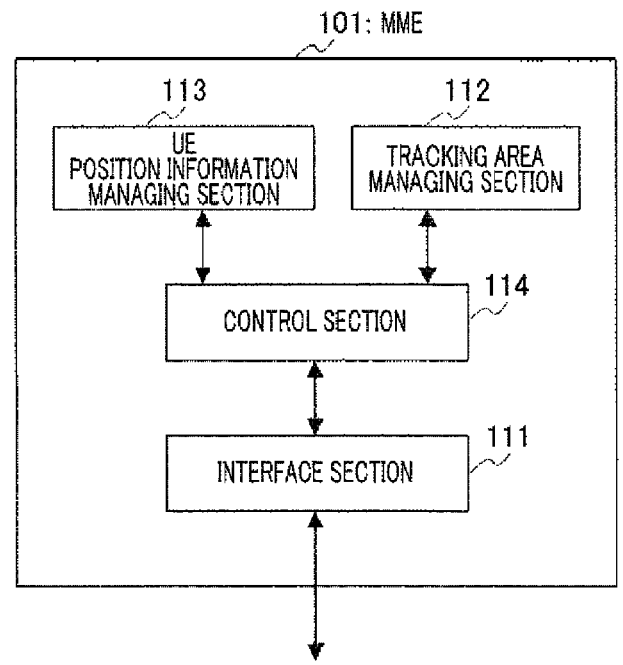
FIG. 5 is a block diagram showing a configuration of the MME shown in FIG. 4.

The configuration of MME 101 shown in FIG. 4 will be described using FIG. 5. Interface section 111 is connected to a mobile communication network.

Tracking area managing section 112 stores cells existing in each tracking area and information on their nodes B and positional relationships between different tracking areas.

UE position information managing section 113 manages TAI of a tracking area where each UE exists as position information of the UE.

Control section 114 determines processing contents based on control signals transmitted/received to/from interface section 111 and information stored in tracking area managing section 112 and UE position information managing section 113.

Figure 6:
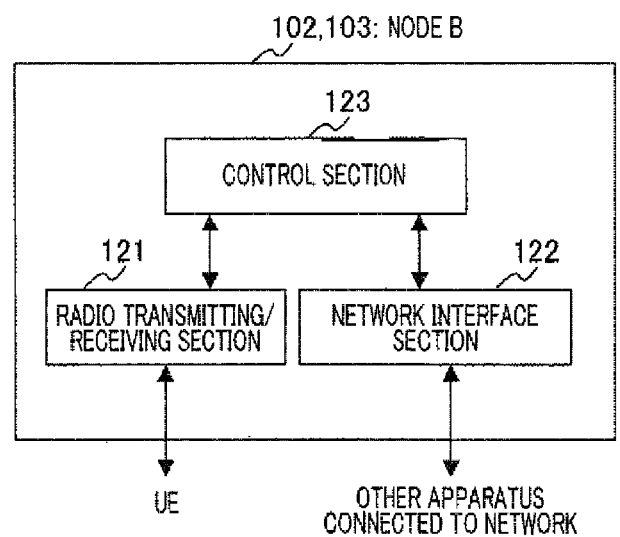
FIG. 6 is a block diagram showing a configuration of the large-cell node B and small-cell node B shown in FIG. 4.

Next, the configurations of large-cell node B 102 and small-cell node B 103 shown in FIG. 4 will be described using FIG. 6. Radio transmitting/receiving section 121 transmits/receives a radio signal.

Network interface section 122 transmits signals to MME 101 connected to a network and other neighboring nodes B and receives signals transmitted from those apparatuses.

Control section 123 generates and controls signals for controlling UE 104 and signals transmitted/received via network interface section 122 and radio transmitting/receiving section 121.

Figure 7:
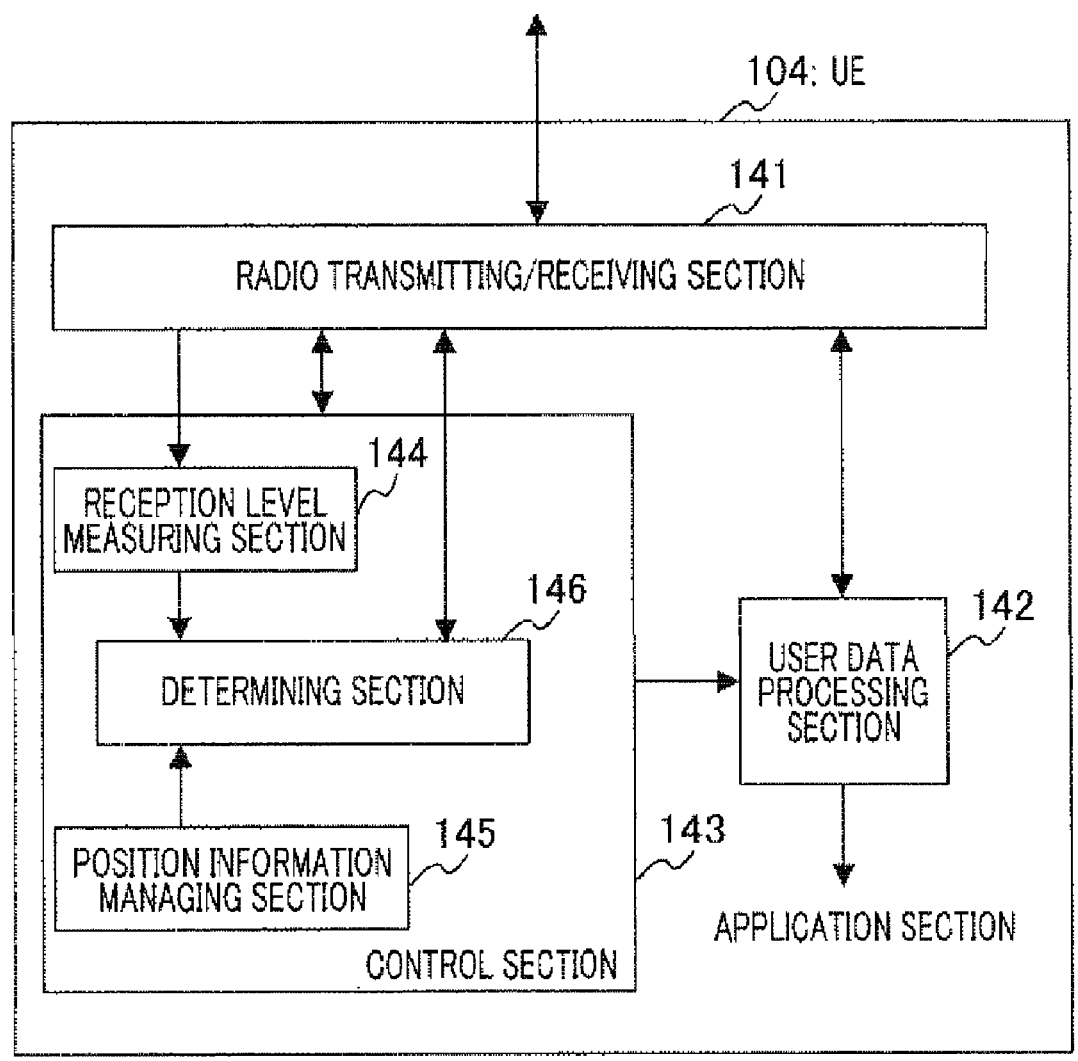
FIG. 7 is a block diagram showing a configuration of the UE shown in FIG. 4.

Next, the configuration of UE 104 shown in FIG. 4 will be described using FIG. 7. Radio transmitting/receiving section 141 transmits/receives radio signals.

User data processing section 142 processes user data and outputs the user data to an application section (not shown).

Control section 143 is provided with reception level measuring section 144, determining section 146 and position information managing section 145 and carries out transmission/reception and processing of control signals.

Reception level measuring section 144 measures the level of a received signal and outputs the measurement result to determining section 146. Position information managing section 145 stores a TAI of the cell in which UE 104 is actually located. When UE 104 moves to a neighboring cell, determining section 146 determines whether or not the neighboring cell is a femto cell, compares the TAI sent from node B as broadcast information with the TAI stored in position information managing section 145 and determines whether or not they are different TAIs.

Here, for example, when a femto cell is a CSG base station which provides an access-limited cell, each CSG base station is assigned a specific TAI for access right management and access authentication and the UE stores a TAI list (white list) of accessible femto cell base stations in advance. UE 104 determines whether or not a TA identifier or cell identifier (cell ID) received through a broadcast channel (BCH) of the connected base station is found in the TAI list, and can thereby identify whether or not the base station is an accessible CSG base station. That is, when the cell identifier is found in the TAI list, that base station can be identified as an accessible CSG base station.

Figure 8:
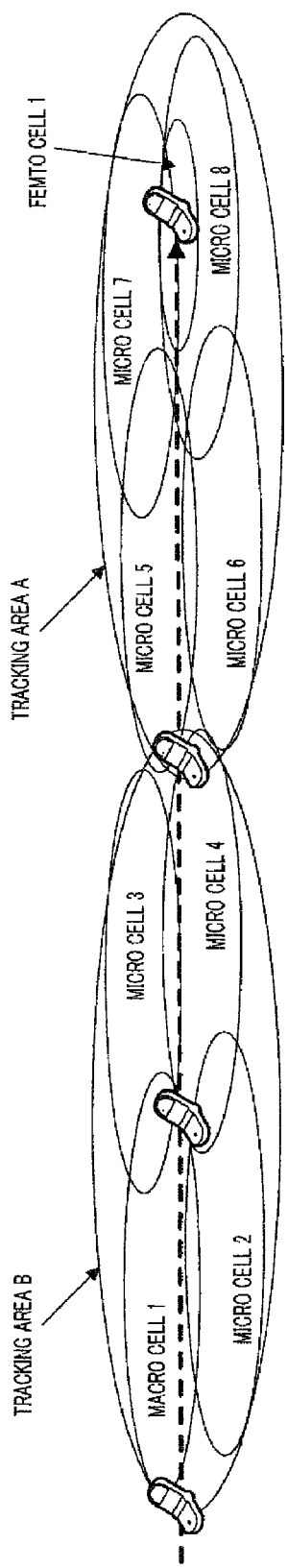
FIG. 8 is a diagram illustrating how a UE in an idle state moves.

Next, operation of each apparatus described above will be described. As shown in FIG. 8, tracking area update procedures (hereinafter referred to as "TAU") when UE 104 in an idle state moves will be described.

As shown in FIG. 8, UE 104, which has moved to macro cell 1, enters tracking area B (TAI=TA-B) having a TAI different from the previous one, and therefore UE 104 transmits a tracking area update signal (hereinafter referred to as "TAU signal") to MME 101 via large-cell node B 102 of macro cell 1.

MME 101, which has received the TAU signal, searches a peripheral tracking area from tracking area managing section 112 based on the received TAI, adds a TAI (TA-A) of tracking area A, which is a neighboring tracking area, and a TAI (here, suppose TAI=TA-femto1 as femto cell 1), which is the tracking area of a femto cell to which connection of UE 104 located therein is authorized to TAI=TA-B of tracking area B according to a multi-TA registration scheme and thereby assigns three TAIs to UE 104. MME 101 transmits a distribution signal (Tracking Area Confirm) including the TAIs of TA-A, TA-B and TA-femto1 to UE 104 and registers the three TAIs with UE position information managing section 113 together with the identifier of each UE.

UE 104, which has received the distribution signal, stores three TAIs included in the distribution signal in position information managing section 145.

UE 104, which has moved further, moves from macro cell 4 to macro cell 5. In this case, since UE 104 enters tracking area A, which is a new tracking area, UE 104 receives TAI=TA-A, which is different from the previous one according to broadcast information.

Upon confirming that the received TA-A is already stored in position information managing section 145, UE 104 continues to move without transmitting any TAU signal to the network. Thus, although UE 104 comes and goes across the boundary between tracking area A and tracking area B, UE 104 need not perform any TAU procedure, and can thereby reduce TAU signals. Therefore, it is possible to reduce loads on UE 104 and MME 101 and reduce power consumption of UE 104.

Next, a case will be described where UE 104 that continues moving moves from macro cell 8 to femto cell 1, which is a small-cell radio communication base station apparatus located within the cell.

In normal movement between macro cells, when the reception level of a signal transmitted from the currently connected node B lowers and falls below a threshold, UE 104 starts measuring the signal transmitted from a node B in the neighboring cell (measurement of peripheral cell). As this threshold, the UMTS defines a threshold (Sintra) to start measuring signals of the same frequency and a threshold (Sinter) to start measuring signals of different frequencies. Since the reception level of a signal transmitted from a macro cell node B seldom falls below the threshold, it is necessary to measure signals from a node B that manages a femto cell at fixed intervals irrespective of this threshold.

Figure 9:
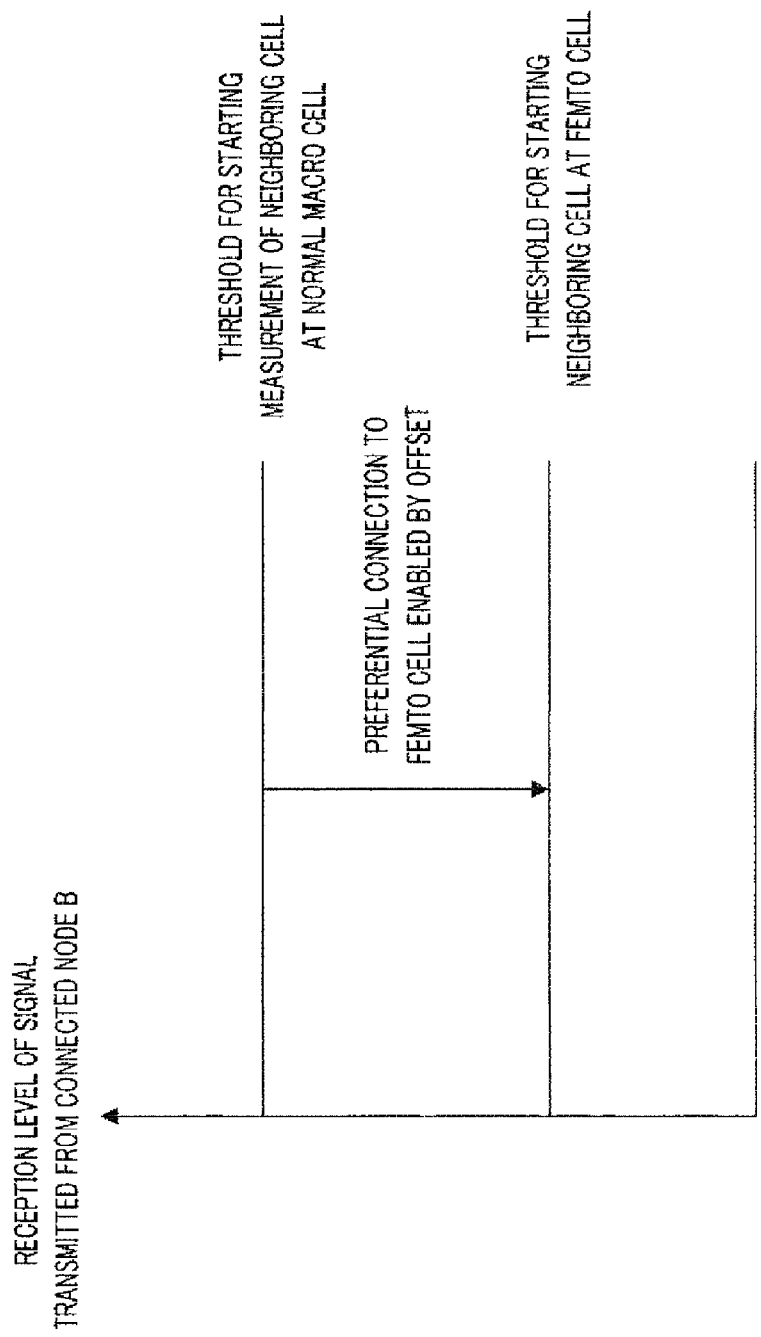
FIG. 9 is a diagram illustrating cell switching thresholds.

On the other hand, in measurement of the above-described peripheral cell, after receiving a signal from the node B in the femto cell and switching to the femto cell, UE 104 uses a threshold of a smaller value than the threshold to start measuring the peripheral cell used for the above-described macro cell in order to be connected to the femto cell with higher priority (see FIG. 9). For example, a value obtained by subtracting a predetermined value from Sintra or a value obtained by subtracting a predetermined value from Sinter is used. This threshold is a threshold specific to femto cells. That is, this value is the threshold for switching to the small-cell node B (femto cell base station) (hereinafter referred to as "femto cell threshold"). In the case of a CSG cell, this threshold for the small-cell node B is called a "CSG cell threshold" for switching to the CSG cell.

Especially the present embodiment uses a value with a negative offset added to the threshold for starting measurement of a peripheral cell used for a macro cell as the femto cell threshold.

In UE 104, reception level measuring section 144 measures the reception level of the node B in the femto cell and performs switching to the femto cell when the measured reception level in the femto cell exceeds the femto cell threshold.

Regarding the determination on the femto cell, determining section 146 determines a flag (e.g. flag=1 for femto cells and flag=0 for macro cells) included in a broadcast signal transmitted from the small-cell node B that manages the femto cell and UE 104 can thereby recognize that the connected cell is the femto cell.

Figure 10:
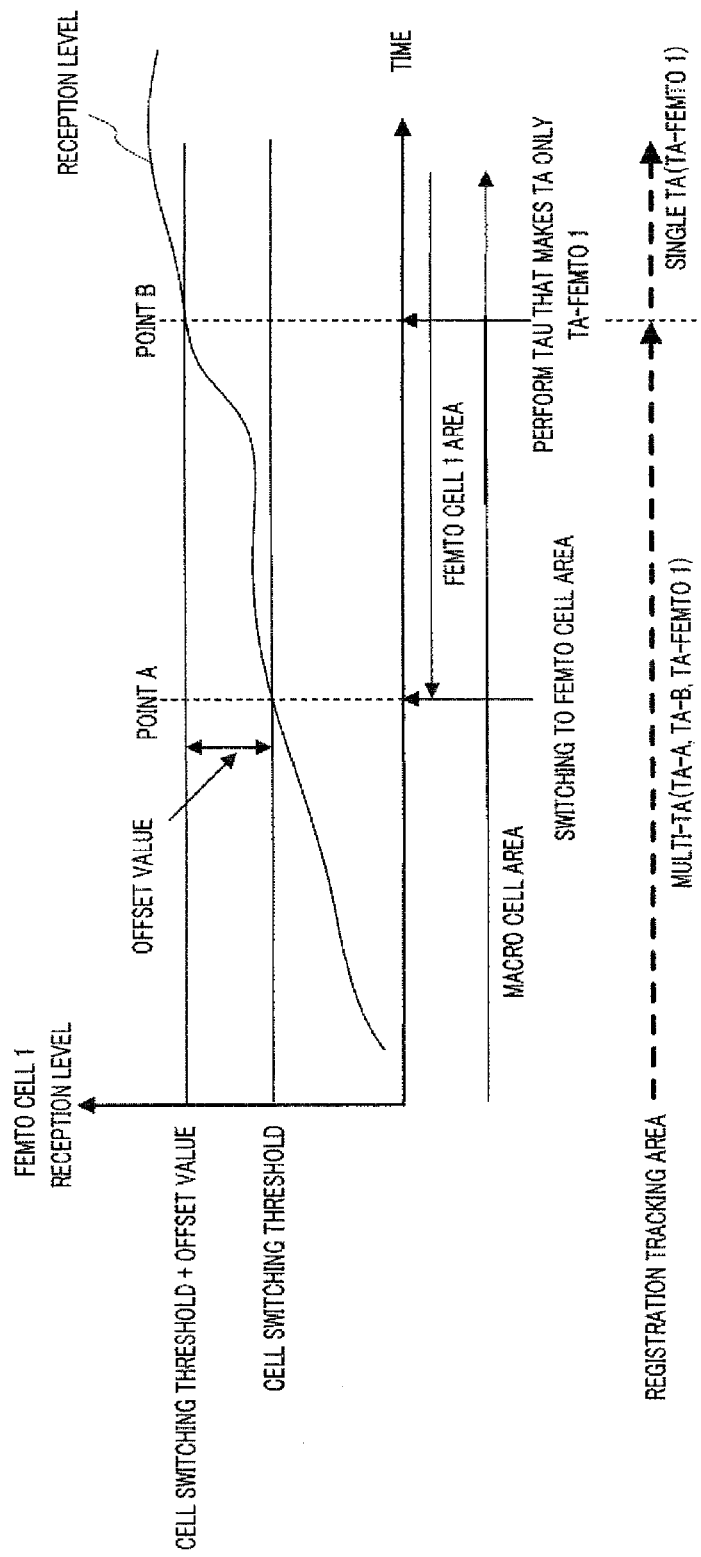
FIG. 10 is a diagram illustrating cell switching according to a reception level of a femto cell.
Figure 11:
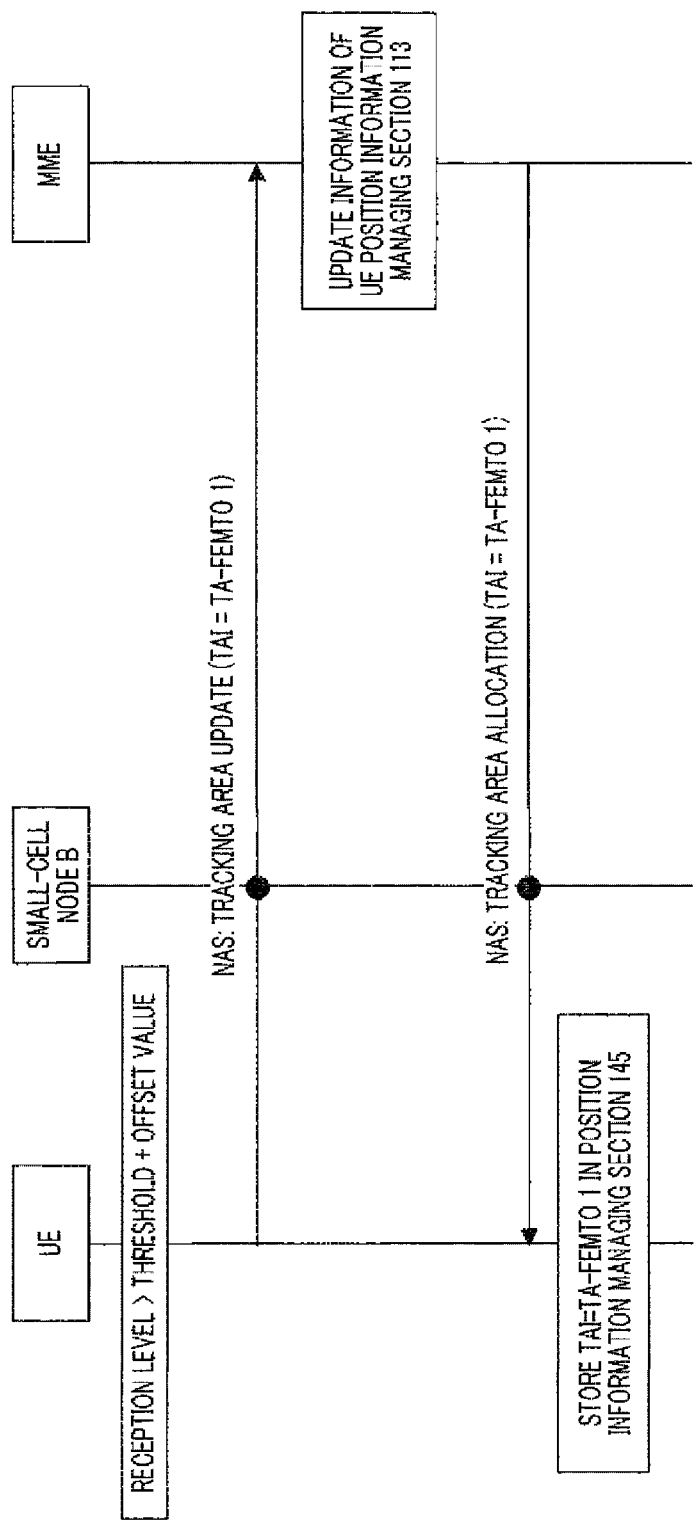
FIG. 11 is a sequence diagram illustrating procedural steps of TAU procedures for switch to single-TA registration.

Here, when UE 104 constantly stays in, for example, a living room or in its seat within femto cell 1 and obtains a sufficient reception level compared to that at a cell edge, and the reception level measured by reception level measuring section 144 exceeds a femto cell threshold+offset value (point B in FIG. 10), radio transmitting/receiving section 141 transmits a position management area update request signal for requesting a single tracking area to MME 101 and requests MME 101 to switch from the multi-TA registration state until then to single-TA registration (single-TA registration) of only TAI=TA-femto1 of femto cell 1. FIG. 11 illustrates procedural steps of TAU procedures for switch to single-TA registration.

Thus, according to Embodiment 1, UE 104 requests MME 101 for switching from multi-TA registration to single-TA registration according to the reception level from the femto cell, and can thereby reduce unnecessary paging messages to a plurality of peripheral macro cells through switchover to registration of one tracking area and reduce TAU signals. This makes it possible to reduce loads on UE 104 and MME 101, reduce power consumption of UE 104 and reduce the load originating from paging on the whole system.

Although the present embodiment uses a value obtained by adding an offset value to a femto cell threshold, the present invention is not limited to this, and the femto cell threshold may be used instead.

(Embodiment 2)

Embodiment 2 of the present invention will describe different procedures from the procedures for switch from multi-TA registration to single-TA registration described in Embodiment 1. To be more specific, a case will be described where periodic position information update procedures specified in an existing system such as the UMTS are used. Since the configurations of an MME and node B according to Embodiment 2 of the present invention are the same as those of Embodiment 1 shown in FIG. 5 and FIG. 6, the configurations thereof will be described using FIG. 5 and FIG. 6.

Figure 12:
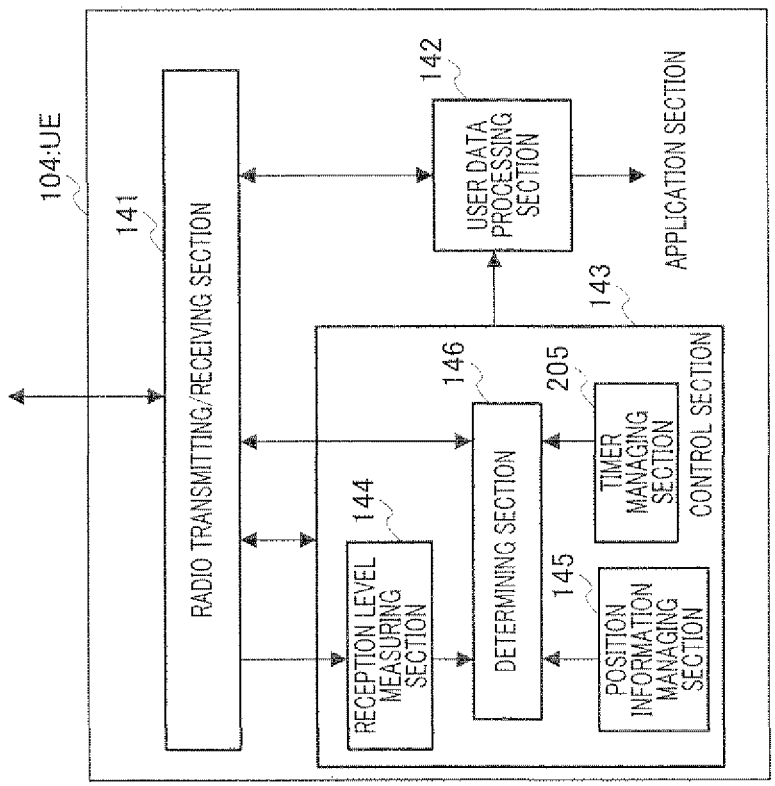
FIG. 12 is a block diagram illustrating a configuration of a UE according to Embodiment 2 of the present invention.

The configuration of UE 104 according to Embodiment 2 of the present invention will be described using FIG. 12. FIG. 12 is different from FIG. 7 in that tuner managing section 205 is added. Timer managing section 205 performs time management on periodic position information update procedures.

Figure 13:
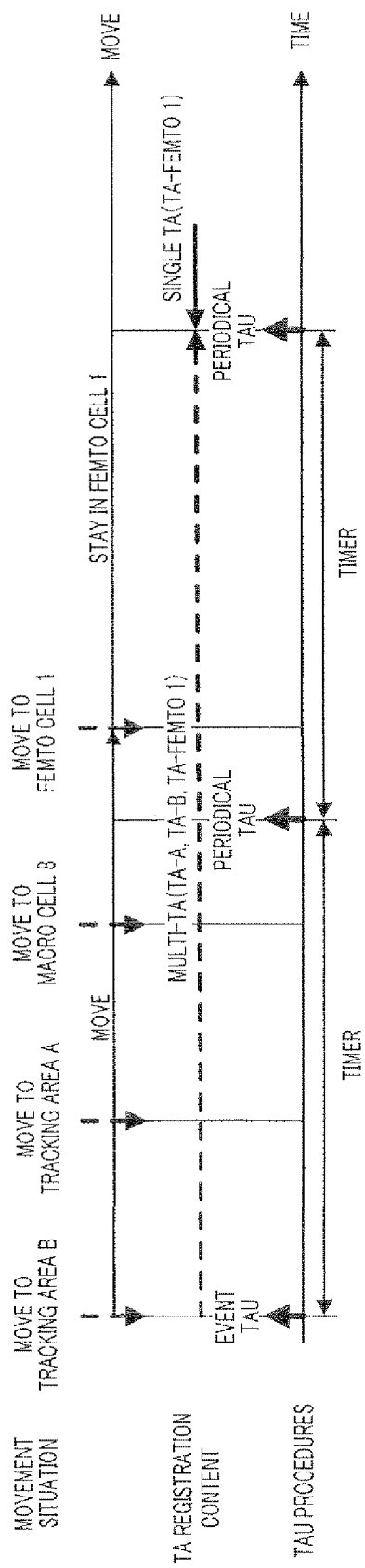
FIG. 13 is a timing chart illustrating procedures for switch from multi-TA registration to single-TA registration carried out when a UE is connected to a femto cell.

FIG. 13 illustrates procedures for switch from multi-TA registration to single-TA registration performed by UE 104 while UE 104 is connected to a femto cell. As shown in FIG. 13, UE 104, which has moved to tracking area B, transmits a TAU signal to MME 101 because a TAI of tracking area B is different from a TAI stored in position information managing section 145. MME 101 assigns TA-A, which is a TAI of a peripheral tracking area and TA-femto1 to UE 104 in addition to TA-B, which is the TAI of tracking area B, and UE 104 is set in a multi-TA registration state. Thus, TAU carried out when UE 104 moves to a tracking area whose TAI is different from the stored TAI will be referred to as "event TAU."

Suppose a case where UE 104 then continues to move and moves to tracking area A and femto cell 1. In this case, since UE 104 already stores TA-A and TA-femto1, UE 104 need not send any new event TAU.

However, in the UMTS, which is currently providing services, there is procedures of periodically carrying out TAU even when event TAU is not carried out and checking position information of UE 104 with the network (hereinafter referred to as "periodical TAU").

Figure 14:
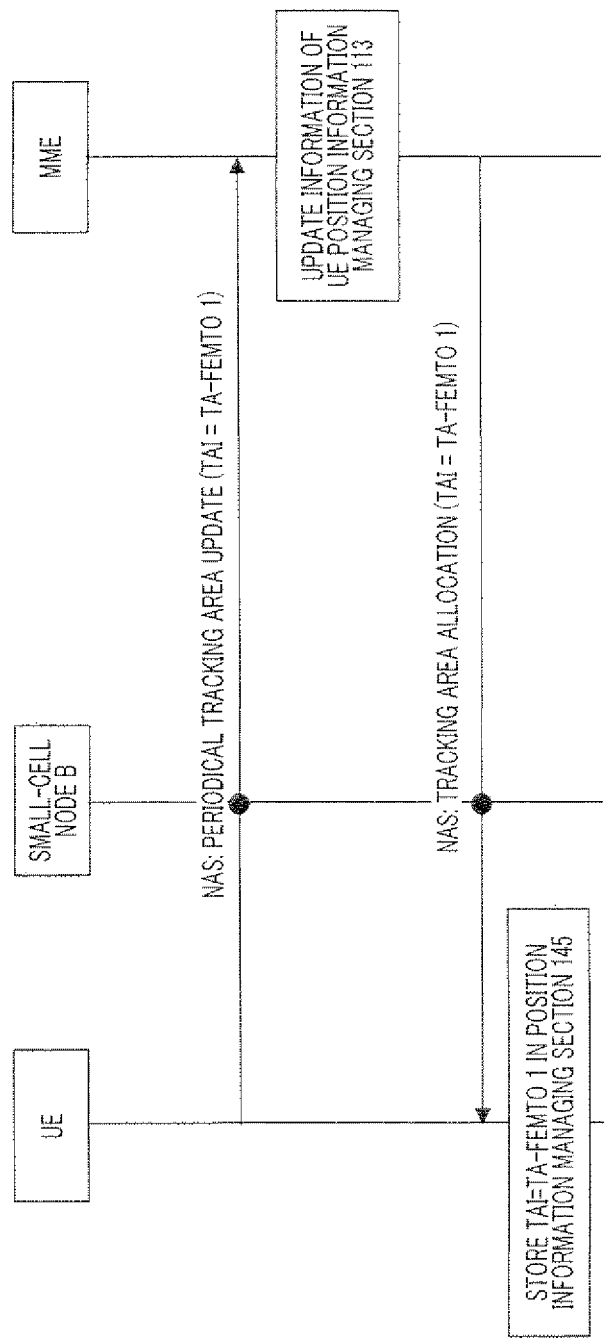
FIG. 14 is a sequence diagram illustrating procedural steps in procedures for switching from multi-TA registration to single-TA registration according to Embodiment 2.

In UE 104, reception level measuring section 144 measures the reception level of a femto cell and switches the connected cell to the femto cell when the measured reception level exceeds a threshold. Furthermore, determining section 146 recognizes that the connected cell is the femto cell from a flag included in broadcast information transmitted from the femto cell. After that, as shown in FIG. 13, when periodical TAU is carried out while UE 104 is connected to femto cell 1, UE 104 performs procedures for switch from multi-TA registration to single-TA registration using the procedures of the periodical TAU. In this operation, timer managing section 205 which manages the timer of the periodical TAU reports an expiration of the timer to determining section 146 and when the destination is a femto cell, determining section 146 generates a position management area update request signal for requesting single-TA registration and transmits the request signal to the MME. FIG. 14 illustrates procedural steps of switching procedures from multi-TA registration to single-TA registration of Embodiment 2.

Thus, according to Embodiment 2, UE 104 requests MME 101 for switching from multi-TA registration to single-TA registration using periodical TAU carried out while UE 104 is connected to the femto cell, performs switching to registration of one tracking area, and can thereby reduce unnecessary paging messages to a plurality of peripheral macro cells and reduce TAU signals. This makes it possible to reduce the load on the UE and MME, reduce UE power consumption and reduce the load caused on the whole system by paging.

(Embodiment 3)

Embodiment 3 of the present invention will describe procedures whereby a UE in an idle state receives a paging message within a femto cell for the first time, transmits the first call connection request signal and switches from multi-TA registration to single-TA registration in the process of transition to an active state, which is a data communication state. Configurations of an MME, node B and UE according to Embodiment 3 of the present invention are the same as those of Embodiment 1 shown in FIGS. 5 to 7, the configurations thereof will be described using FIGS. 5 to 7.

Figure 15:
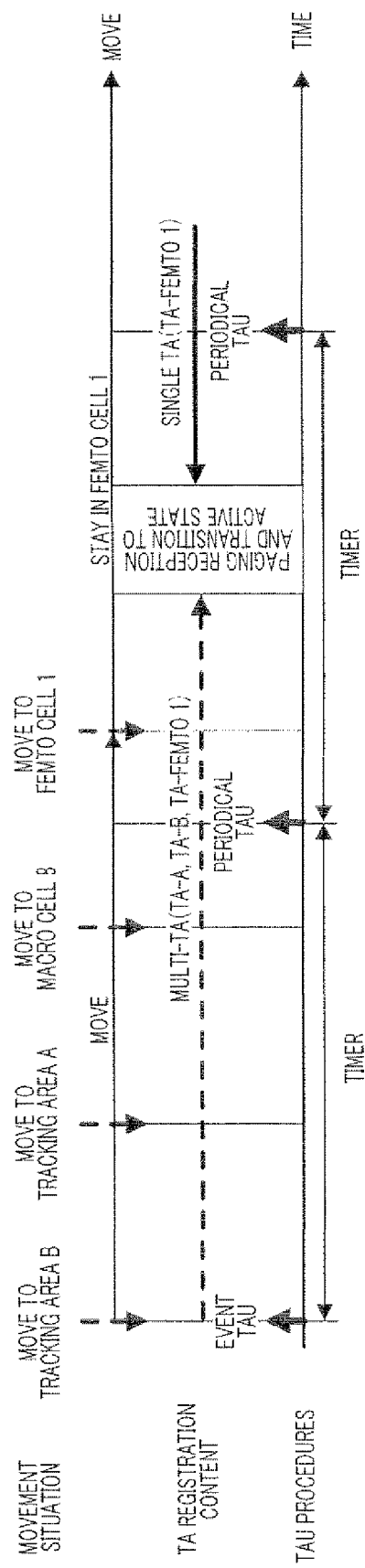
FIG. 15 is a timing chart illustrating procedures for switch from multi-TA registration to single-TA registration when the UE is connected to a femto cell.

FIG. 15 shows timing to switch from multi-TA registration to single-TA registration while UE 104 is connected to a femto cell. As shown in FIG. 15, UE 104 connected to femto cell 1 receives a paging message from a network for the first time, requests MME 101 to switch to single-TA registration in the process of transition from an idle state to an active state and enters a single-TA registration state in which UE 104 is registered only with TA-femto1.

Figure 16:
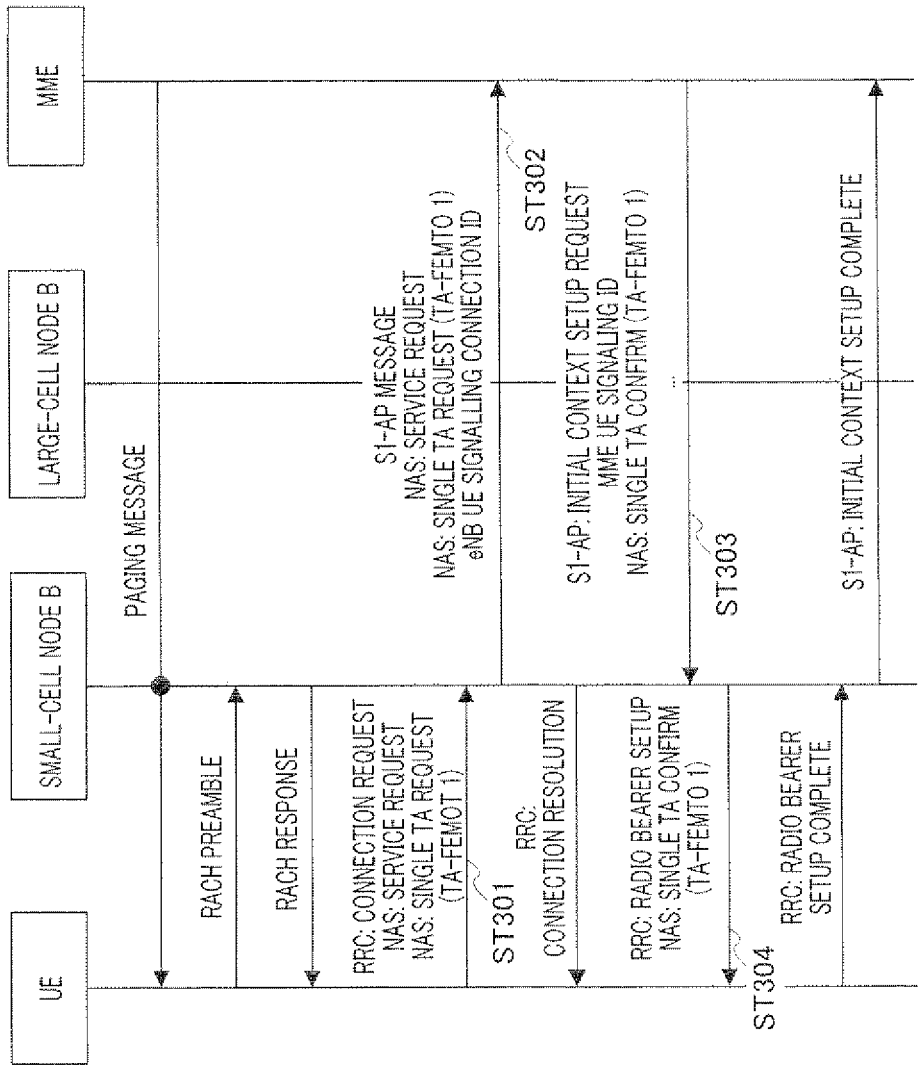
FIG. 16 is a sequence diagram illustrating procedures for a request for switch from multi-TA registration to single-TA registration using paging message reception and procedures for transition to an active state.

FIG. 16 illustrates procedures for a request for switch from multi-TA registration to single-TA registration using paging message reception and procedures for transition to an active state. UE 104, which has received a paging message from MME 101 via a small-cell node B of connecting femto cell 1, performs a series of procedures for carrying out data communication.

In FIG. 16, in step (hereinafter abbreviated as "ST") 301, a single-TA registration request (NAS Single-TA Request) is added in addition to a call connection request signal (RRC Connection Request) and NAS service request and switch of TA-femto1 to single-TA registration is requested.

In ST 302, the request message in ST 301 is added to an S1-AP message transmitted from small-cell node B 103 to MME 101 and sent to MME 101.

In ST 303, MME 101, which has received a single-TA registration request to TA-femto1, confirms that the position information of UE 104 managed by UE position information managing section 113 includes not only TAI of transmitted TA-femto1 but also other TAIs (TA-B and TA-A) registered, deletes the other TAIs from UE position information managing section 113, adds NAS single TA confirm to an SI-AP initial context setup request message and transmits the message to small-cell node B 103.

In ST 304, small-cell node B 103 adds the transmitted NAS single TA confirm message to existing RRC radio bearer request and transmits the message to UE 104. UE 104, which has received the confirmation message, stores only TAI=TA-femto1 of femto cell 1 in position information managing section 145 and switching to single-TA registration with only TA-femto1 is completed.

Thus, according to Embodiment 3, UE 104 receives a paging message in the femto cell for the first time, requests MME 101 to switch to single-TA registration in the process of transition from an idle state to an active state, switches to registration of one tracking area, and can thereby reduce unnecessary paging messages to a plurality of peripheral macro cells and reduce TAU signals. This makes it possible to reduce the load on the UE and MME, reduce UE power consumption and reduce the load caused on the whole system by paging.

Figure 17:
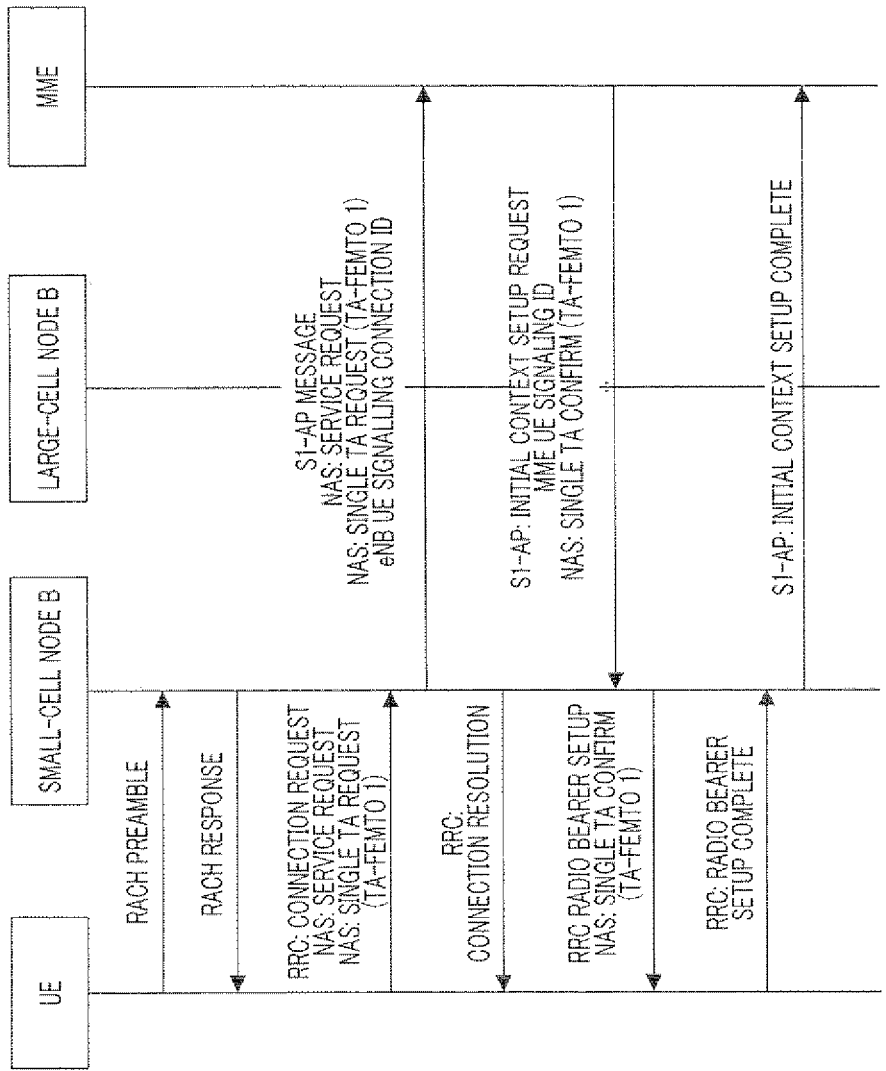
FIG. 17 is a sequence diagram illustrating procedures for a request for switch from multi-TA registration to single-TA registration in a process of performing call setup procedures for carrying out data communication for the first time.

In Embodiment 3, as shown in FIG. 17, UE 104 adds message contents similar to those in FIG. 16 to the first call connection request signal in the process of call setup procedures for carrying out data communication for the first time in a femto cell, and can thereby perform procedures for switching from multi-TA registration to single-TA registration.

A case has been described so far assuming that a position management area update request signal for requesting single-TA registration is added to a call connection request signal transmitted for the first time after being connected to the femto cell and transmitted irrespective of the reception level from the femto cell. Here, suppose a position management area update request signal for requesting single-TA registration is transmitted only when the reception level of a femto cell exceeds a level which is the cell switching threshold shown in Embodiment 1 with an offset value added.

To be more specific, when paging is received or when UE 104 itself makes a call connection, if UE 104 is connected to a femto cell or determining section 146 determines that the reception level has exceeded a reference level (threshold+ offset value), radio transmitting/receiving section 141 transmits a call connection request signal with a position management area update request signal for requesting single-TA registration added.

This makes it possible to judge that UE 104 is connected to the femto cell more stably and switches to single-TA registration.

Although the present embodiment uses a value obtained by adding an offset value to a threshold, the present invention is not limited to this but the offset value may not be used.

(Embodiment 4)

Embodiment 4 of the present invention will describe procedures for switching from multi-TA registration to single-TA registration when a UE in an active state moves (performs handover) to a femto cell in the process of a handover procedure. Since the configurations of an MME, node B and UE according to Embodiment 3 of the present invention are the same as the configurations of Embodiment 1 shown in FIGS. 5 to 7, those configurations will be described using FIG. 5 to 7.

Figure 18:
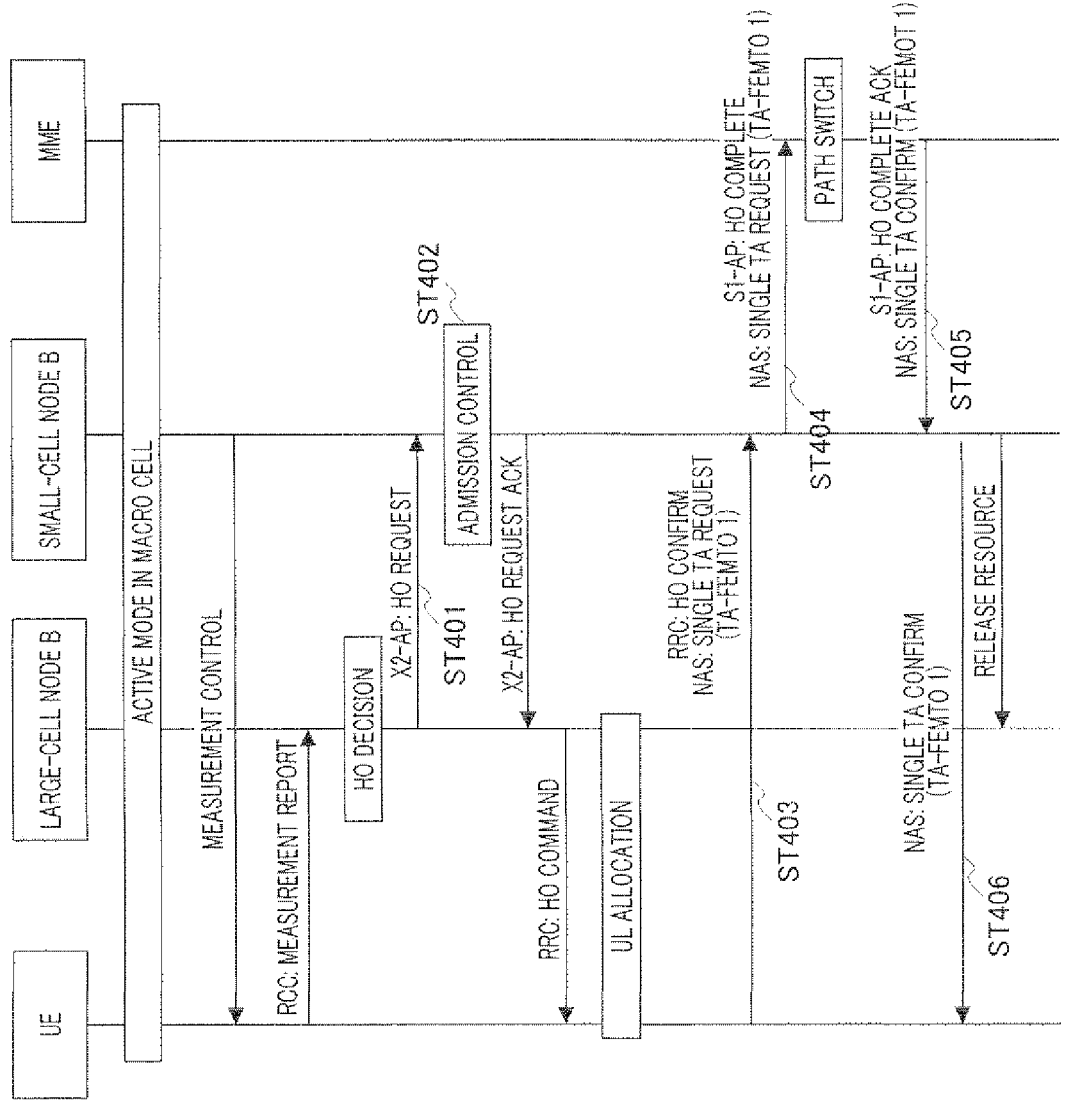
FIG. 18 is a sequence diagram illustrating procedures for switch from multi-TA registration to single-TA registration when the UE is connected to a femto cell.

FIG. 18 illustrates procedures for switching from multi-TA registration to single-TA registration when a UE is connected to a femto cell. When a UE in an active state moves to femto cell 1, a series of handover procedures is performed.

In FIG. 18, in ST 401, large-cell node B 102, which is the handover source, makes a handover request (HO request) and in ST 402, small-cell node B 103, which is the handover destination, allows handover.

In ST 403, UE 104 adds a NAS single TA request to an RRC HO confirm message and sends the message to small-cell node B 103. In ST 404, the request message in ST 403 is added to an S1-AP HO complete message to be sent from small-cell node B 103 to MME 101 and sent to MME 101.

MME 101, which has received a single-TA registration request to TA-femto1, confirms that the position information of UE 104 managed by UE position information managing section 113 includes other TAIs (TA-B and TA-A) registered in addition to the TAI of transmitted TA-femto1, deletes the other TAIs from UE position information managing section 113, adds NAS single TA confirm to an SI-AP HO complete ACK message in ST 405 and transmits the message to small-cell node B 103.

In ST 406, small-cell node B 103 transmits the transmitted NAS single TA confirm message to UE 104. UE 104, which has received the confirmation message, stores only TAI=TA-femto1 of femto cell 1 in position information managing section 145 and switching to single-TA registration of only TA-femto1 is completed.

Thus, according to Embodiment 4, when UE 104 in an active state moves to a femto cell, UE 104 requests MME 101 for switching from multi-TA registration to single-TA registration in the process of a handover procedure, makes a switchover to registration of one tracking area, and can thereby reduce unnecessary paging messages to a plurality of peripheral macro cells and reduce TAU signals. This makes it possible to reduce the load on the UE and MME, reduce UE power consumption and reduce the load caused on the whole system by paging.

(Embodiment 5)

Embodiment 5 of the present invention will describe a case where after completion of communication in an active state in a femto cell, whether to switch from multi-TA registration to single-TA registration or continue multi-TA registration without any switching is judged based on a result of measurement of the level of a received signal of a femto cell carried out in an active state, and switching is then performed. By the way, configurations of an MME, node B and UE according to Embodiment 5 of the present invention are the same as those of Embodiment 1 shown in FIGS. 5 to 7, and therefore, the configurations thereof will be described using FIGS. 5 to 7.

Figure 19:
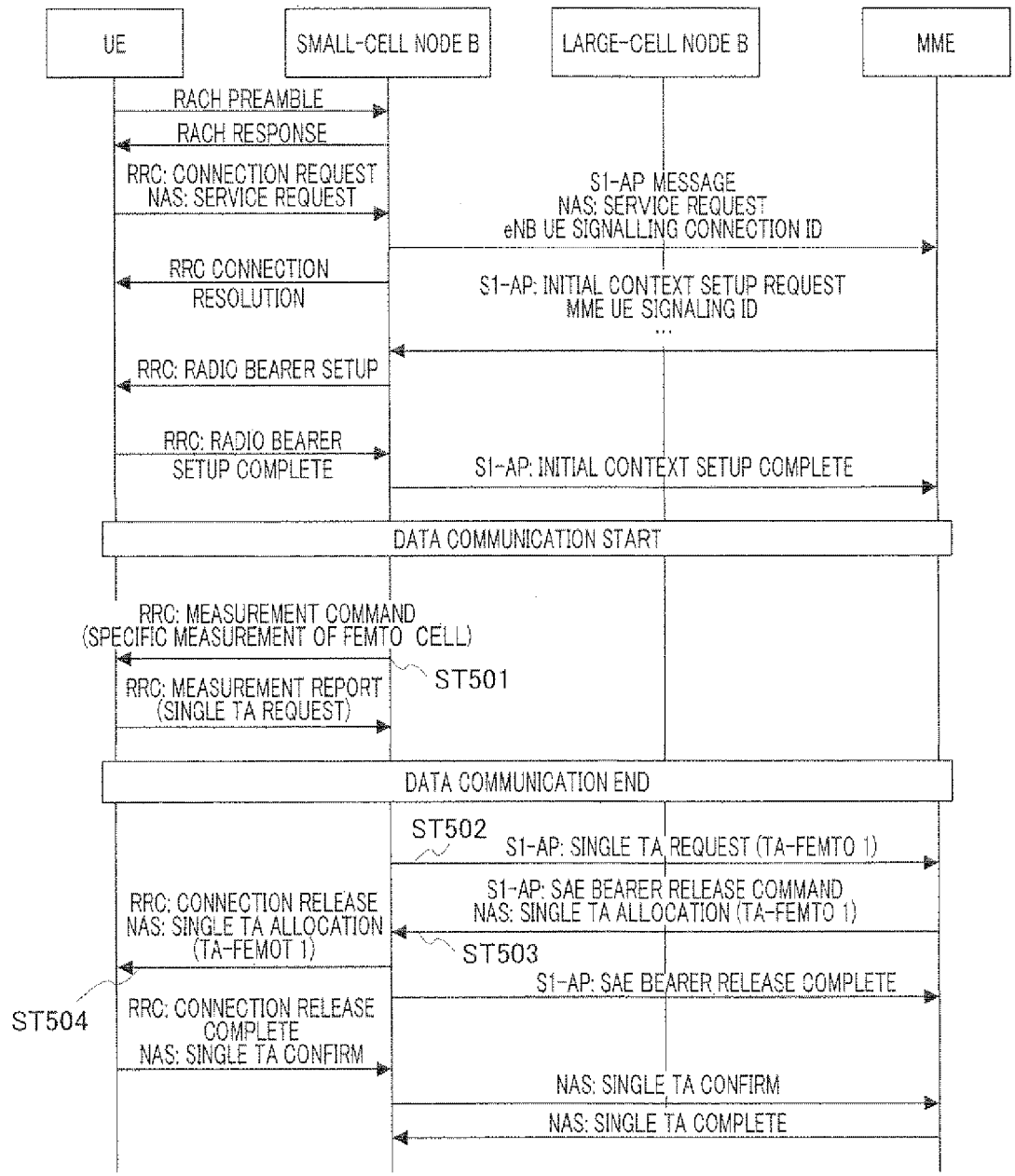
FIG. 19 is a sequence diagram illustrating procedures for switch from multi-TA registration to single-TA registration when the UE is connected to a femto cell.

FIG. 19 illustrates procedures for switching from multi-TA registration to single-TA registration while UE 104 is connected to a femto cell. As shown in FIG. 19, for UE 104 in which data communication has been started through reception of a paging message or transition to an active state by UE 104 itself, in ST 501, control section 123 of small-cell node B 103 generates a signal on the measurement of the received signal specific to femto cells and on the method of reporting the result thereof as RRC measurement command and reports the signal to UE 104.

FIG. 20 illustrates the reception level in the femto cell and the method of reporting the measurement result to node B. As shown in FIG. 20, when the reception level in the femto cell falls below femto cell threshold+offset value (case 2), continuation of multi-TA registration is requested. When the reception level in the femto cell exceeds femto cell threshold+offset value (case 3), switching from multi-TA registration to single-TA registration is requested.

FIG. 19 illustrates a case where the measurement result corresponds to case 3 and a single-TA registration request is reported to small-cell node B 103 by measurement report. Measurement of the reception level of such a femto cell is performed periodically while UE 104 is located within the area of the femto cell and UE 104 reports the measurement result (measurement report) to small-cell node B 103 every time the state changes to case 1, 2 or 3, and small-cell node B 103 updates the latest state of the reception level and TA registration request.

After a while after completion of data communication, UE 104 performs procedures for releasing resources in the radio section used for data communication and wired sections between small-cell node B 103 and MME 101, and network apparatuses associated therewith or the like.

In ST 502, small-cell node B 103 checks the latest situation of the switching request from UE 104 and transmits single-TA registration request to MME 101 when the situation corresponds to case 3.

In ST 503, MME 101 which has received a single-TA registration request to TA-femto1, confirms that the position information of UE 104 managed by UE position information managing section 113 includes other TAIs (TA-B and TA-A) registered in addition to the transmitted TAI of TA-femto1, deletes the other TAIs from UE position information managing section 113, adds NAS single TA allocation to the existing SI-AP SAE bearer release command message and transmits the message to small-cell node B 103.

In ST 504, small-cell node B 103 adds the transmitted NAS single TA allocation message to RRC connection release and transmits the RRC connection release to UE 104. UE 104, which has received a confirmation message, stores only TAI=TA-femto1 of femto cell 1 in position information managing section 145 and switching of only TA-femto1 to single-TA registration is completed.

Figure 21:
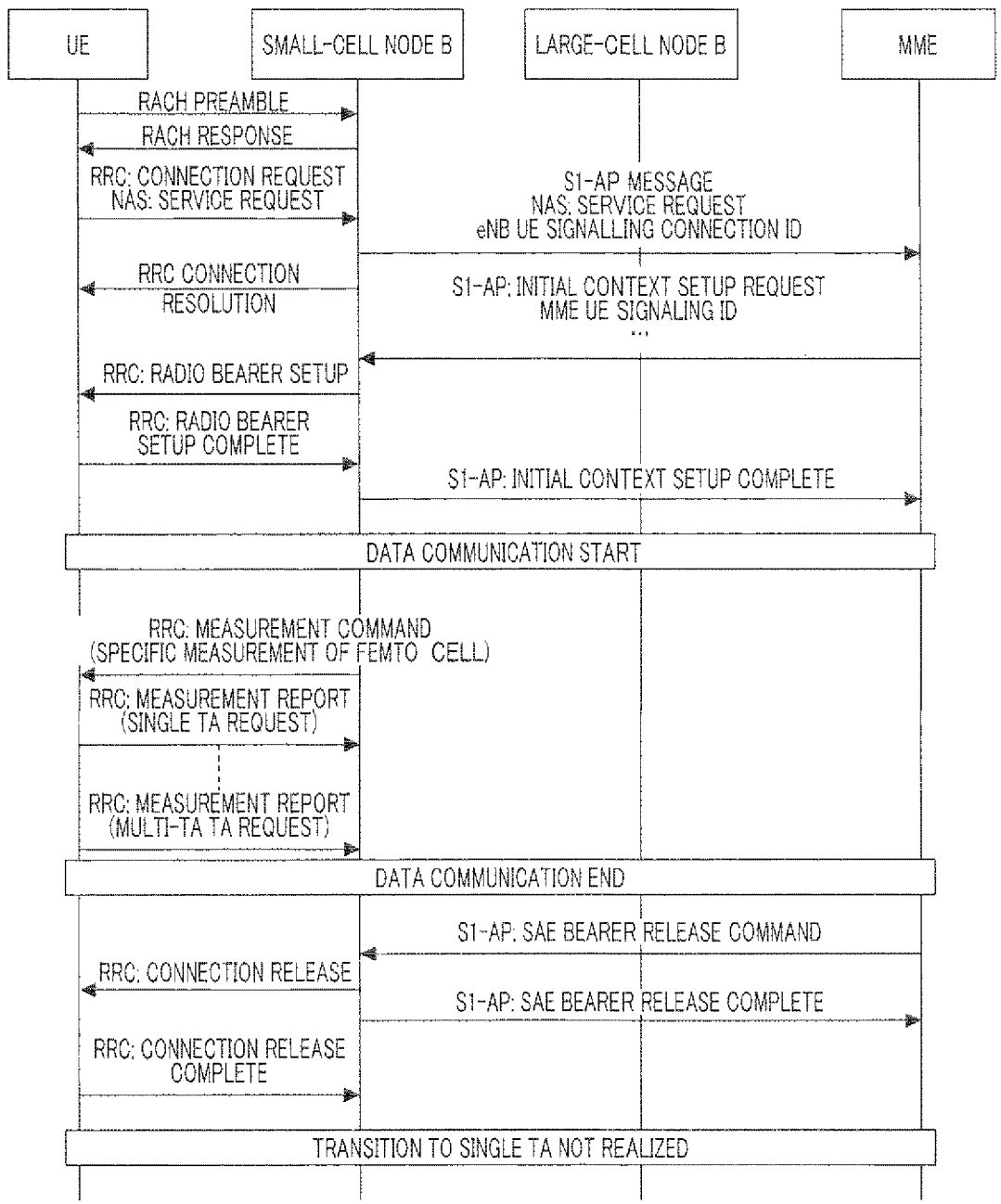
FIG. 21 is a sequence diagram illustrating procedures for switch from multi-TA registration to single-TA registration when the final part before the end of data communication is case 2 shown in FIG. 20.

FIG. 19 illustrates a case where switching to single-TA registration is performed, but when the last part before the end of data communication corresponds to case 2, small-cell node B 103 performs procedures for releasing existing resources without sending any single-TA registration request to MME 101 as shown in FIG. 21.

As the reception level reporting scheme, a scheme has been described here where a report is sent every time the reception level in the femto cell measured by UE 104 transitions between three states illustrated in FIG. 20, and UE 104 performs single-TA registration and requests multi-TA registration, but a method may also be considered whereby UE 104 periodically reports only the reception level and small-cell node B 103 judges between single-TA registration or multi-TA registration.

Figure 22:
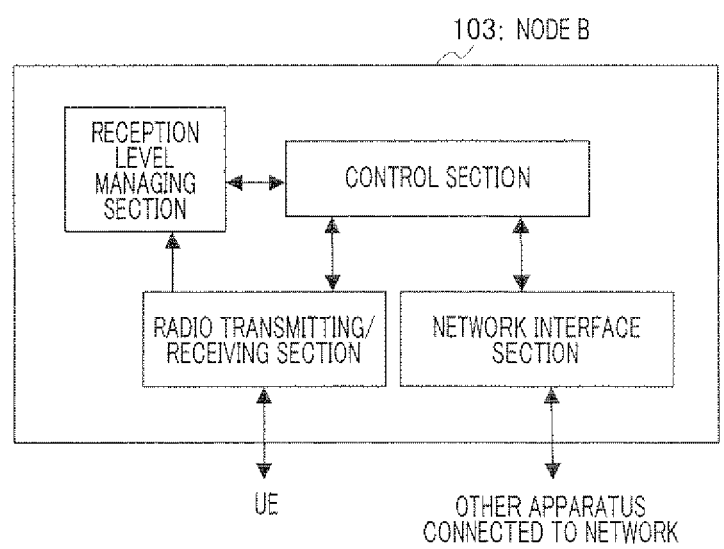
FIG. 22 is a block diagram illustrating another configuration of a small-cell node B according to Embodiment 5 the present invention.
Figure 23:
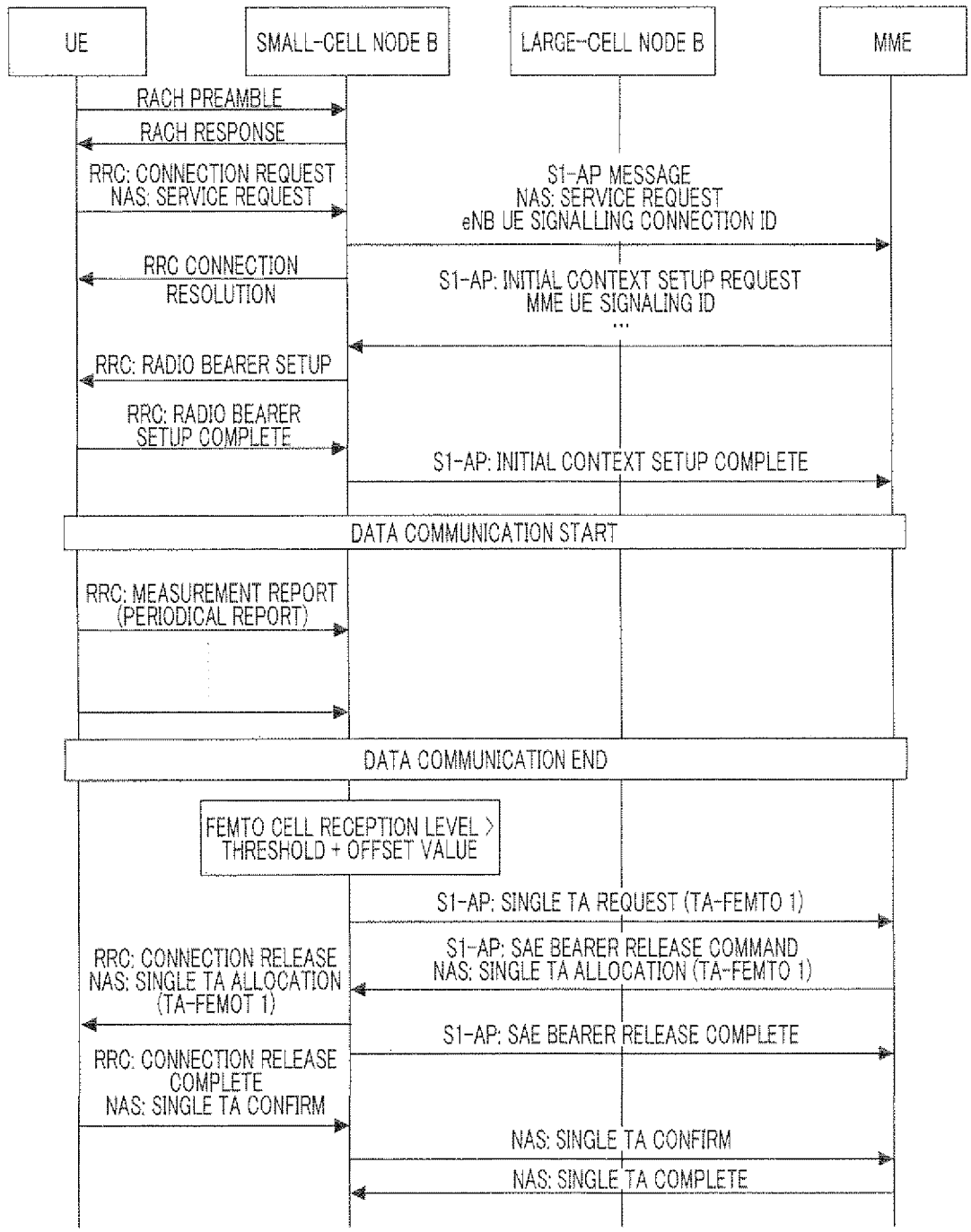
FIG. 23 is another sequence diagram illustrating procedures for switch from multi-TA registration to single-TA registration when the UE is connected to a femto cell.

That is UE 104 may periodically send only the reception level in the femto cell, small-cell node B may make a judgment according to the reception level and may transmit a switching request signal for a single tracking area to MME 101. In this case, small-cell node B 103 has a configuration shown in FIG. 22. Furthermore, the steps of the procedures are as shown in FIG. 23.

Thus, according to Embodiment 5, UE 104 transitions to an active state in the area of the femto cell or UE 104 in an active state performs handover to the femto cell, and after data communication is completed, that is, in the process of transition from the active state to an idle state, it is determined whether or not to switch to single-TA registration based on the result of measurement of the reception level in the femto cell carried out in the active state, and when a condition for switch to single-TA registration is satisfied, UE 104 is set in a single-TA registration state in which only TA-femto1 is registered, and it is thereby possible to reduce unnecessary paging messages to a plurality of peripheral macro cells and reduce TAU signals. This makes it possible to reduce the load on the UE and MME, reduce UE power consumption and reduce the load caused on the whole system by paging.

Furthermore, Embodiment 5 selects switching to single-TA registration in consideration of the latest situation of the reception level in the femto cell, and can thereby reduce new TAU procedures if the multi-TA registration state is continued even when, for example, UE 104 is located at a cell edge of the femto cell as with case 2 in FIG. 20 and UE 104 is assumed to move to a macro cell while the reception level in the femto cell is not sufficiently high.

Even in a case where UE 104 moves to the femto cell in the active state shown in Embodiment 4, by selecting switching to single-TA registration in consideration of the situation of the latest reception level in the femto cell, it is possible to reduce new TAU procedures when UE 104 is assumed to move to a macro cell.

Although the present embodiment uses a value obtained by adding an offset value to a femto cell threshold, the present invention is not limited to this, but a femto cell threshold may also be used instead.

(Embodiment 6)

Embodiments 1 to 5 have described a case where multi-TA registration is switched to single-TA registration, and Embodiment 6 of the present invention will describe a case where a UE is restored to a state of multi-TA registration again while the UE is located in the area of the femto cell. By the way, since the configurations of an MME, node B and UE according to Embodiment 6 of the present invention are the same as those of Embodiment 1 shown in FIGS. 5 to 7, the configurations thereof will be described using FIGS. 5 to 7.

Figure 24:
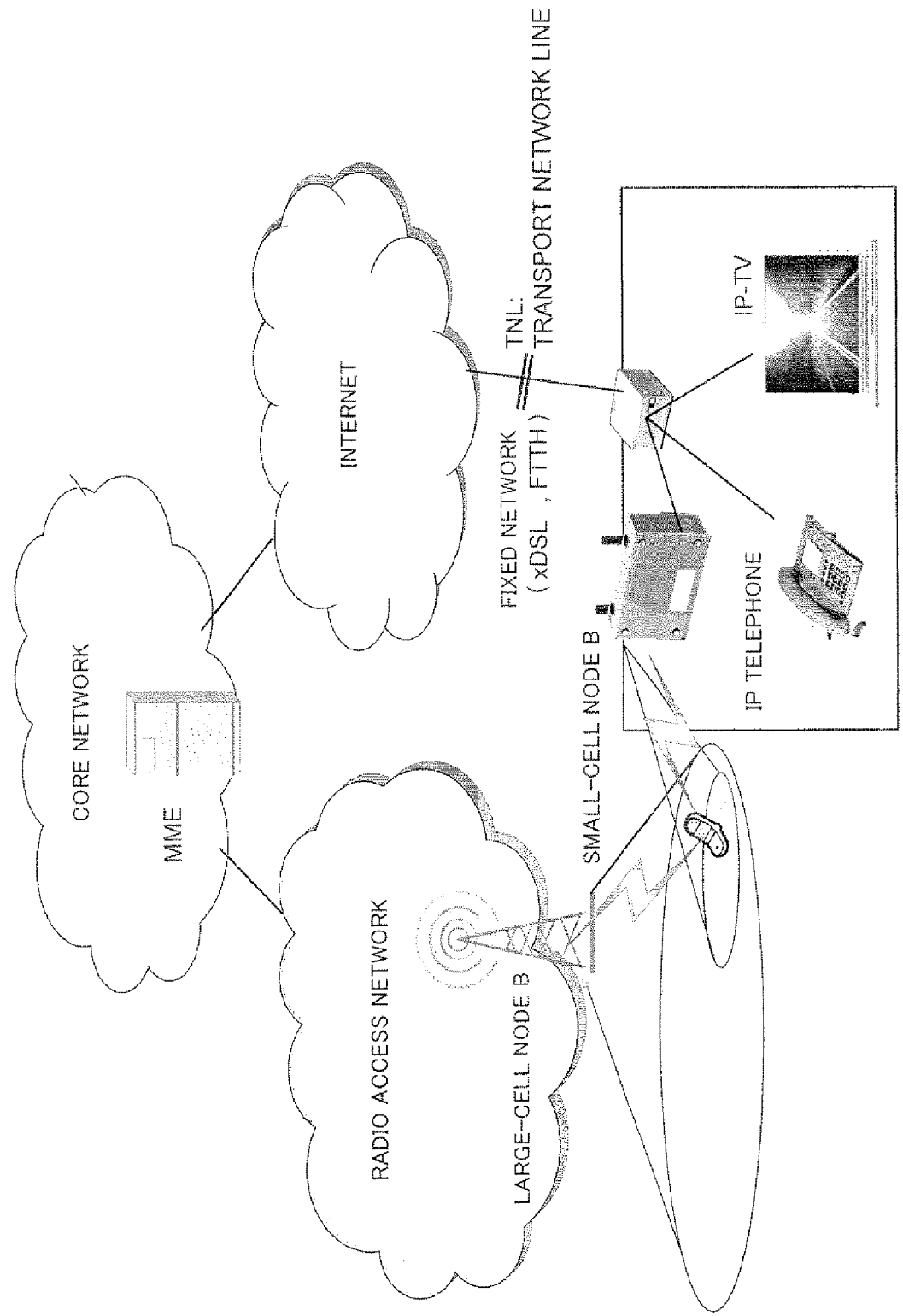
FIG. 24 is a diagram illustrating a system configuration when a femto cell is installed in a home.

There can also be a case where a femto cell is installed in a home or small office. FIG. 24 illustrates a system configuration when the femto cell is installed in a home or small office. As shown in FIG. 24, in each home, an IP telephone, IP-TV, and further a plurality of personal computers are assumed to share one Internet connection fixed network such as xDSL or FTTH in addition to small-cell node B 103.

In such a case, in a radio section between small-cell node B 103 and UE 104, there are fewer UEs 104 connected and it is possible to secure sufficient capacity, whereas the band of the fixed interval (xDSL or FTTH interval) between small-cell node B 103 and MME 101 is occupied by other devices and small-cell node B 103 may not be able to secure sufficient capacity.

In such a situation, UE 104 may not be able to receive a paging message from MME 101 via small-cell node B 103 or even if UE 104 can receive a paging message, UE 104 may not be able to secure a band (QoS) required for subsequent data communication.

Figure 25:
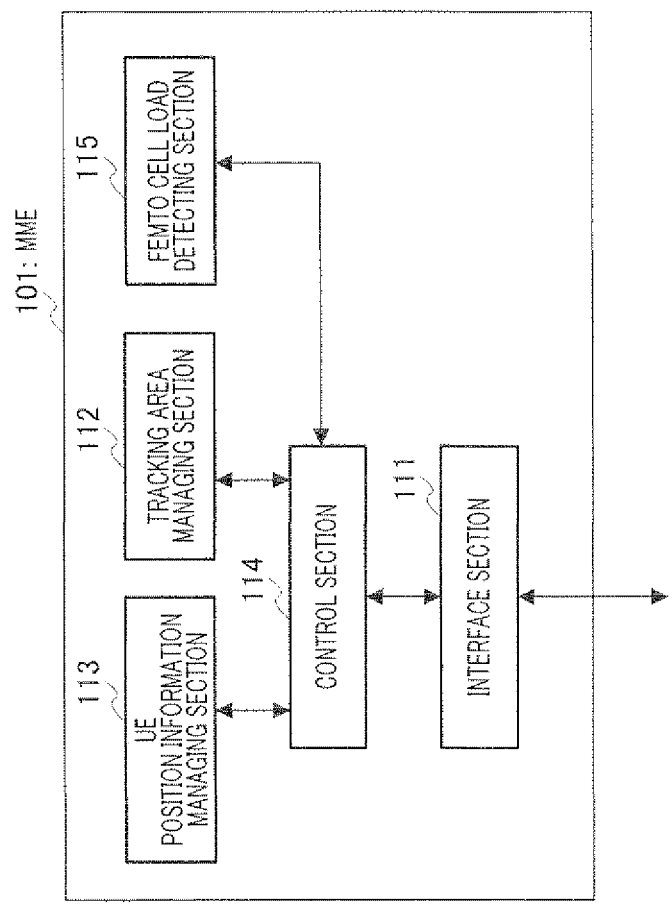
FIG. 25 is a block diagram illustrating a configuration of an MME according to Embodiment 6 of the present invention.

Therefore, as shown in FIG. 25, MME 101 is provided with a femto cell load detection section 115 that measures a network load of a fixed network (xDSL or FTTH) with each small-cell node B 103 and when the amount of load exceeds a predetermined specified value, MME 101 requests UE 104 to get restored to multi-TA registration.

Figure 26:
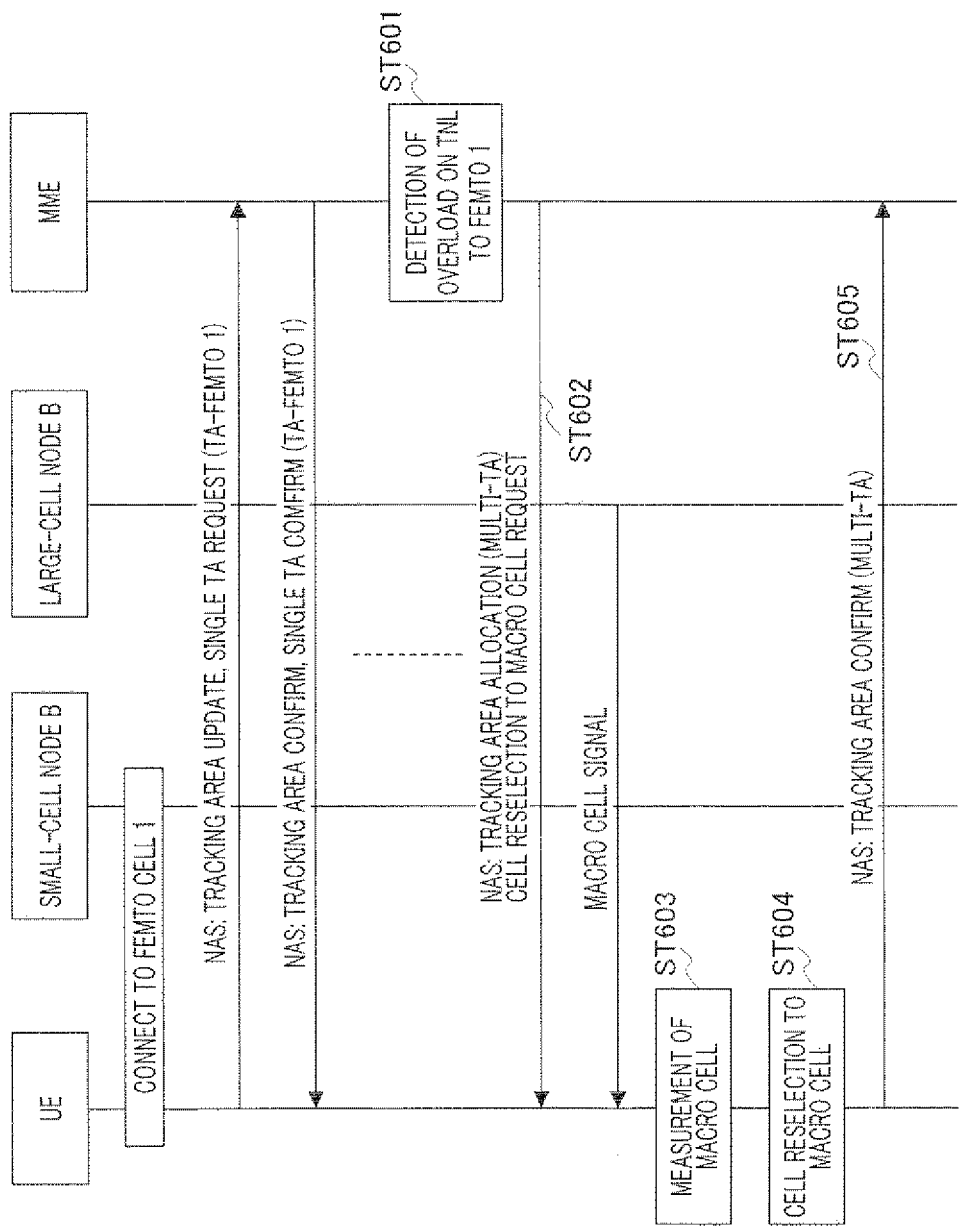
FIG. 26 is a sequence diagram illustrating procedures for restoring multi-TA registration.

Next, procedures for getting restored to multi-TA registration will be described using FIG. 26. As shown in FIG. 26, in ST 601, MME 101 detects that the network load on the fixed network of femto cell 1 has exceeded a specified value, and in ST 602, MME 101 requests UE 104 to switch to multi-TA registration. In this case, as TAIs, TAIs of peripheral tracking areas are also assigned in addition to TA-femto1 currently assigned through single-TA registration. Furthermore, in this message, a signal for requesting switching to a peripheral macro cell is added to UE 104 connected to femto cell 1.

In ST 603, UE 104, which has received the request signal, measures the reception level of the peripheral macro cell, and in ST 604, UE 104 selects a cell having the highest reception level and switches the cells.

Furthermore, a TAI is detected from the received signal and if the TAI is one of TAIs included in the message in ST 602, a confirmation message is sent as with the message in ST 605 and a plurality of given TAIs are stored in the position information management apparatus.

On the other hand, when the TAI of the selected cell is not included in the TAIs sent from the UE, a series of TAU procedures are performed by including the detected TAI in the message in ST 605.

Thus, according to Embodiment 6, while UE 104 is connected to the femto cell, if the amount of load of the fixed network whereby small-cell node B 103 is connected to the network increases, and UE 104 cannot receive the paging message from MME 101 via small-cell node B 103 or even if UE 104 can receive the paging message, if UE 104 cannot secure bands (QoS) required for subsequent data communication, UE 104 switches from single-TA registration to multi-TA registration, switches the cell to a peripheral macro cell, and can thereby avoid a situation in which no paging message can be received or data communication is not possible.

(Embodiment 7)

Embodiment 7 of the present invention will describe a case where each tracking area is assigned priority while keeping a multi-TA registration state and the priority is changed according to the position of a UE. Since the configurations of an MME and node B and UE according to Embodiment 5 of the present invention are the same as those of Embodiment 1 shown in FIGS. 5 to 7, the configurations thereof will be described using FIGS. 5 to 7.

Figure 27:
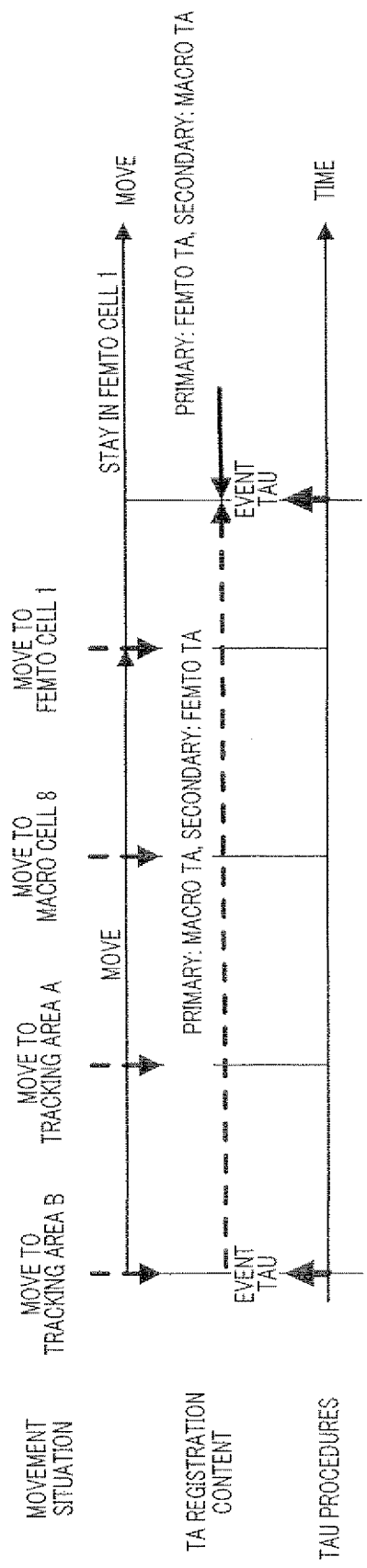
FIG. 27 is a timing chart illustrating switching of priority of tracking areas.

Timing at which the priority of each tracking area is switched will be described using FIG. 27. Here, a case will be described as an example where UE 104 moves as shown in FIG. 8. UE 104, which has moved to macro cell 1, has entered tracking area B (TAI=TA-B) whose TAI is different from the previous TAI, and therefore UE 104 transmits a TAU signal to MME 101.

MME 101, which has received the TAU signal, searches a peripheral tracking area from tracking area managing section 112 based on the received TAI, adds a TAI (TA-A) of tracking area A, which is a neighboring tracking area, and a TAI (here, suppose TAI=TA-femto1 as femto cell 1) of the tracking area of a femto cell accessible to UE 104 located therein to TAI=TA-B of tracking area B according to the multi-TA registration scheme, and thereby assigns three TAIs to UE 104. When a plurality of TAIs are newly assigned in this way, if the TAI of the femto cell is included therein, the TAI of the macro cell is assigned to UE 104 with the highest (primary) priority and the TAI of the femto cell is assigned to UE 104 with the next highest (secondary) priority and MME 101 stores the contents thereof in UE position information managing section 113.

After that, UE 104 continues to move and upon entering the area of the femto cell, UE 104 switches between the primary tracking area and the secondary tracking area. The method and timing of switching may be similar to the methods in Embodiments 1 to 5.

Figure 28A:
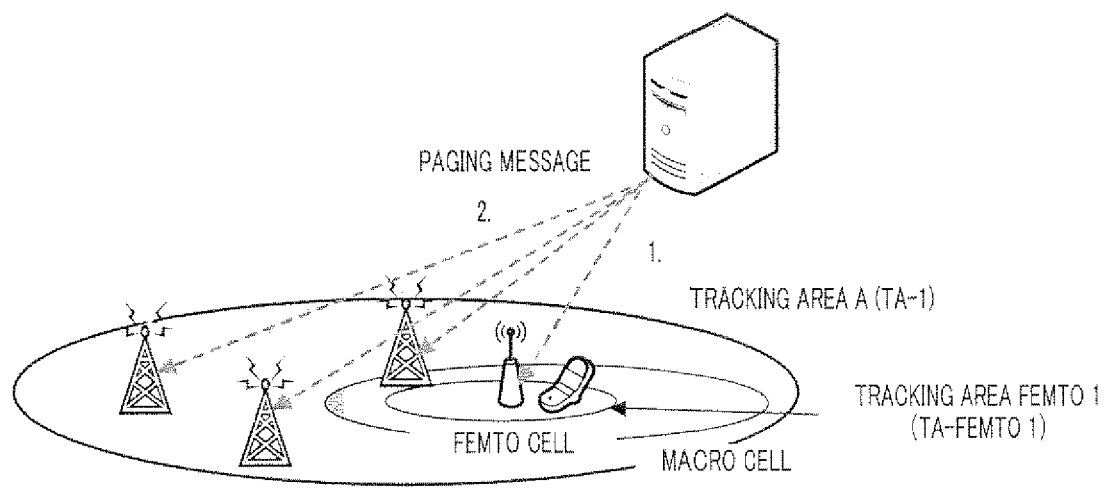
FIG. 28 is a diagram illustrating how a paging message is transmitted in descending order of priority.
Figure 28B:
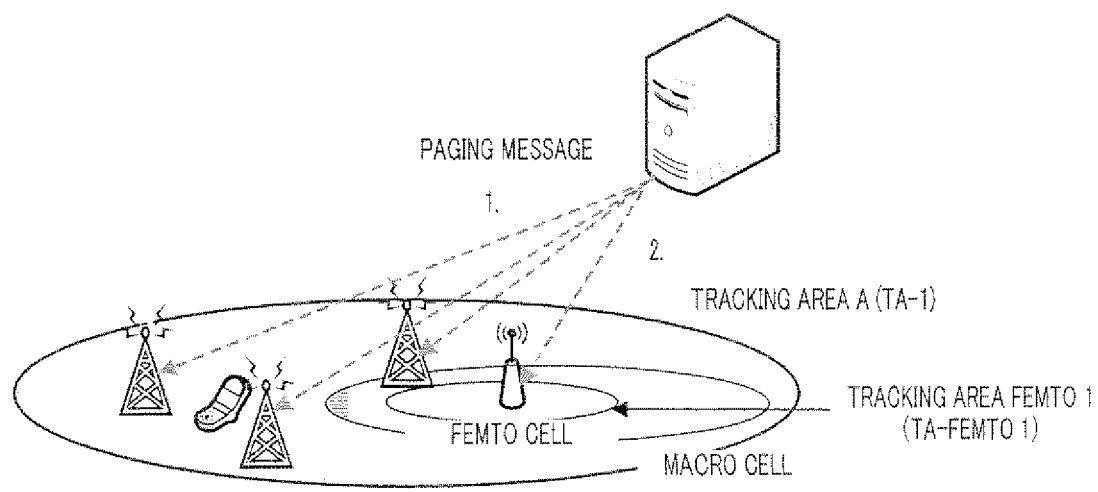

By providing the tracking areas with priorities, paging messages are transmitted in descending order of priority, that is, in order of primary tracking area and secondary tracking area as shown in FIG. 28A and FIG. 28B.

Figure 29:
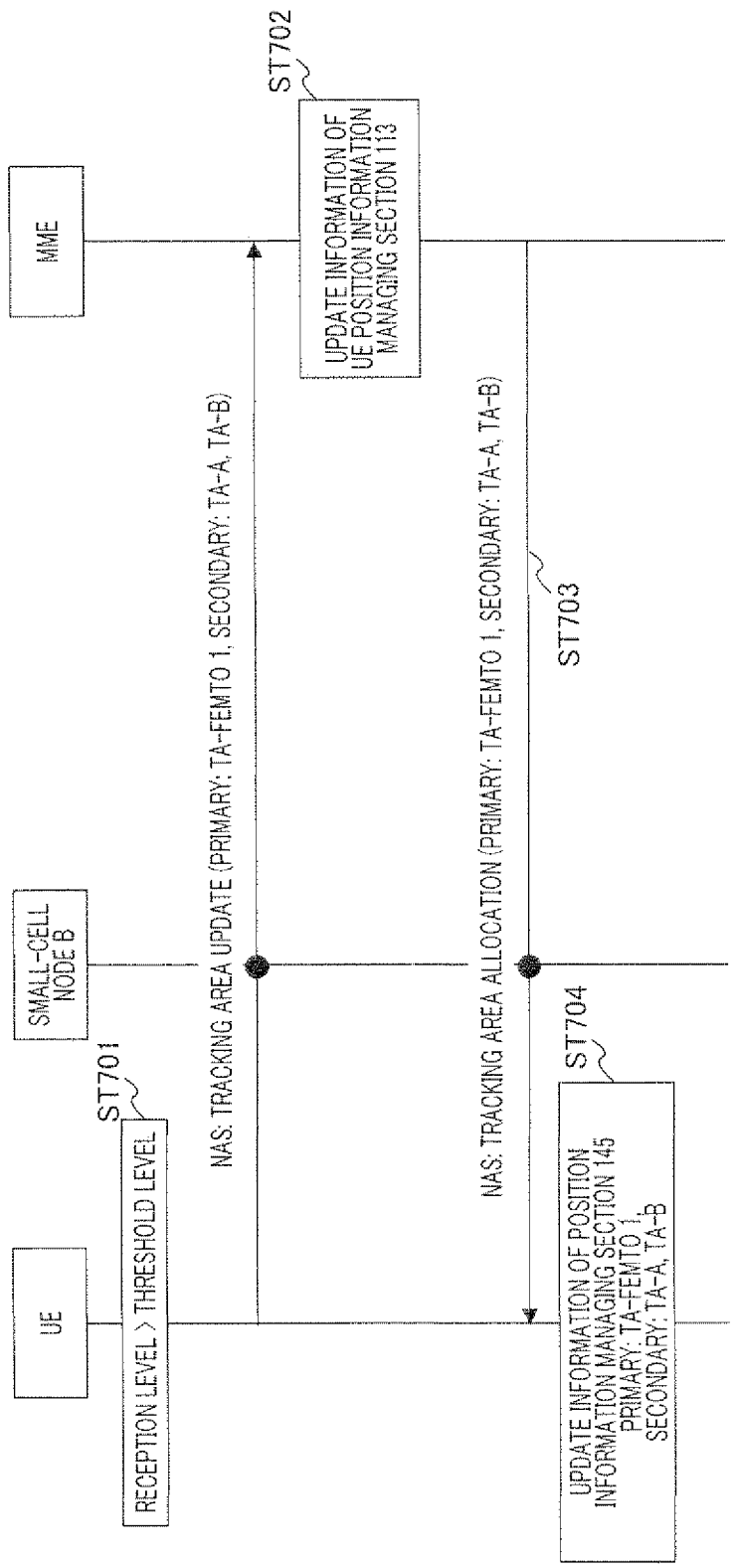
FIG. 29 is a sequence diagram illustrating procedures for switching priority of tracking areas according to a reception level of a femto cell.

Hereinafter, the procedures for switching the priorities of tracking areas according to the reception level in the femto cell will be described using FIG. 29. In FIG. 29, in ST 701, UE 104 enters the area of the femto cell and the reception level exceeds a threshold, UE 104 learns that the information stored in position information managing section 145 is primary TAI=TA-A and TA-B, secondary TAI=TA-femto1 and requests MME 101 to change the primary TAI to TA-femto1.

In ST 702, MME 101, which has received the request signal, updates the information of UE position information managing section 113, and in ST 703, MME 101 sends a confirmation signal to UE 104. Furthermore, in ST 704, UE 104, which has received the confirmation information, updates the information of position information managing section 145.

Thus, according to Embodiment 7, UE 104 in the femto cell area is connected to small-cell node B 103, sends a request for setting the primary tracking area in a multi-TA registration state in the femto cell to MME 101, MME 101 transmits a paging message from the primary tracking area, and can thereby reduce unnecessary paging messages to a plurality of peripheral macro cells and reduce TAU signals. This makes it possible to reduce the load on the UE and MME, reduce UE power consumption and reduce the load caused on the whole system by paging.

(Embodiment 8)

Embodiments 1 to 5 have described the case where switching from multi-TA registration to single-TA registration is performed in one stage, but Embodiment 8 of the present invention will describe a case where switching from multi-TA registration to single-TA registration is performed stepwise. Configurations of an MME, node B and UE are the same as those of Embodiment 1 shown in FIGS. 5 to 7 and therefore the configurations thereof will be described using FIGS. 5 to 7.

Figure 30:
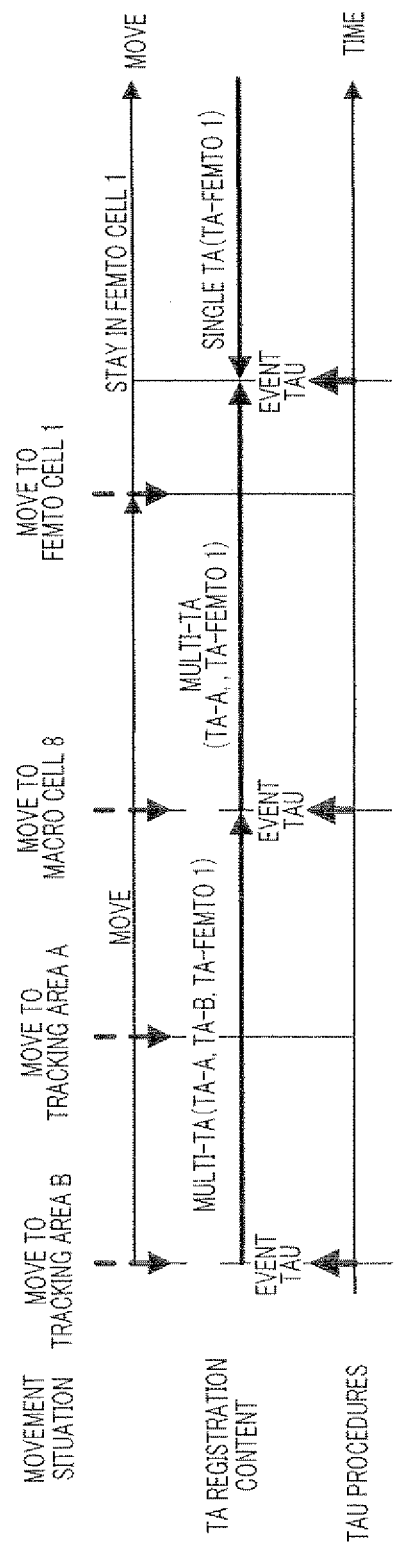
FIG. 30 is a timing chart illustrating stepwise switching from multi-TA registration to single-TA registration.

The stepwise switching from multi-TA registration to single-TA registration will be described using FIG. 30 and FIG. 31. FIG. 30 illustrates a case where UE 104 moves to femto cell 1. When UE 104 moves to tracking area B and when UE 104 assigned a plurality of TAIs (TA-A, TA-B, TA-femto1) moves to macro cell 8, UE 104 executes TAU whereby TA-B is deleted.

Here, UE 104 needs to have a relationship between the TAI of the femto cell to which UE 104 is granted access and a cell 1D of a macro cell that overlaps with the femto cell in advance. According to this relationship, when UE 104 enters macro cell 8 and receives the cell ID thereof, UE 104 recognizes that UE 104 approaches the femto cell and can reduce the registration tracking area to a tracking area including the femto cell and the macro cell that overlaps with this femto cell.

Furthermore, UE 104, which has entered the area of femto cell 1, makes a switchover to single-TA registration (TA-femto1) as with the methods illustrated in Embodiments 1 to 5.

Figure 31:
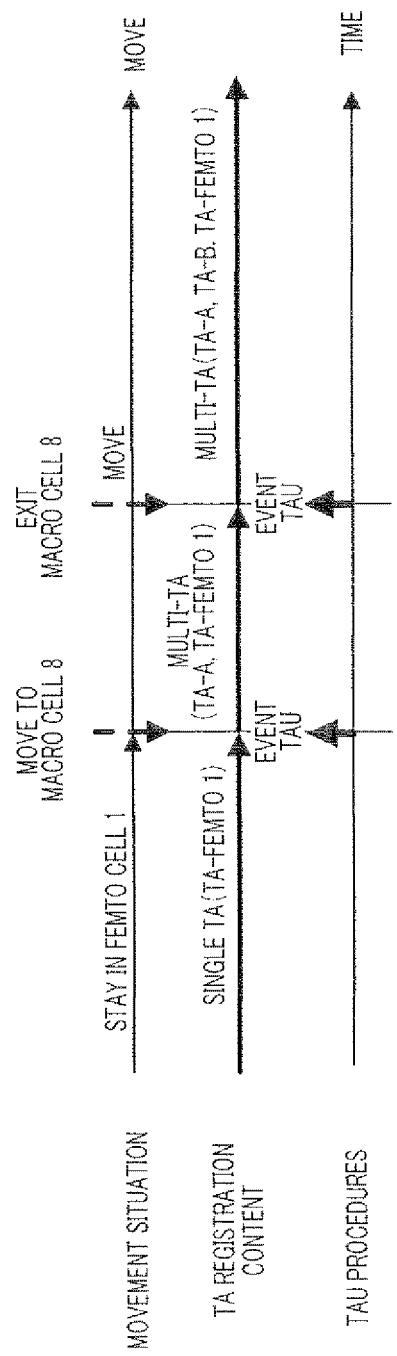
FIG. 31 is a timing chart illustrating stepwise switching from multi-TA registration to single-TA registration.
Figure 32:
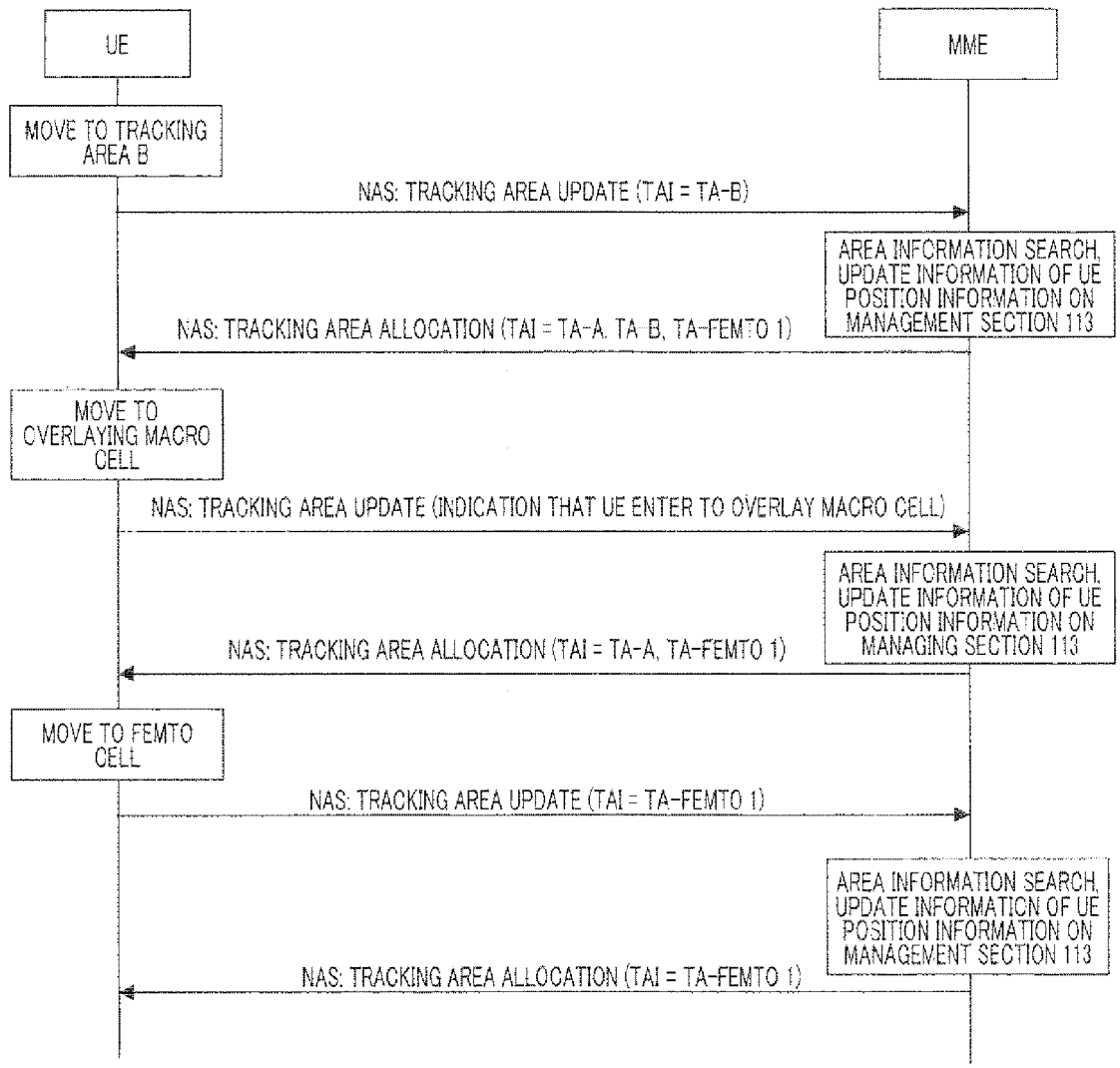
FIG. 32 is a sequence diagram illustrating procedures for stepwise switching from multi-TA registration to single-TA registration.
Figure 33:
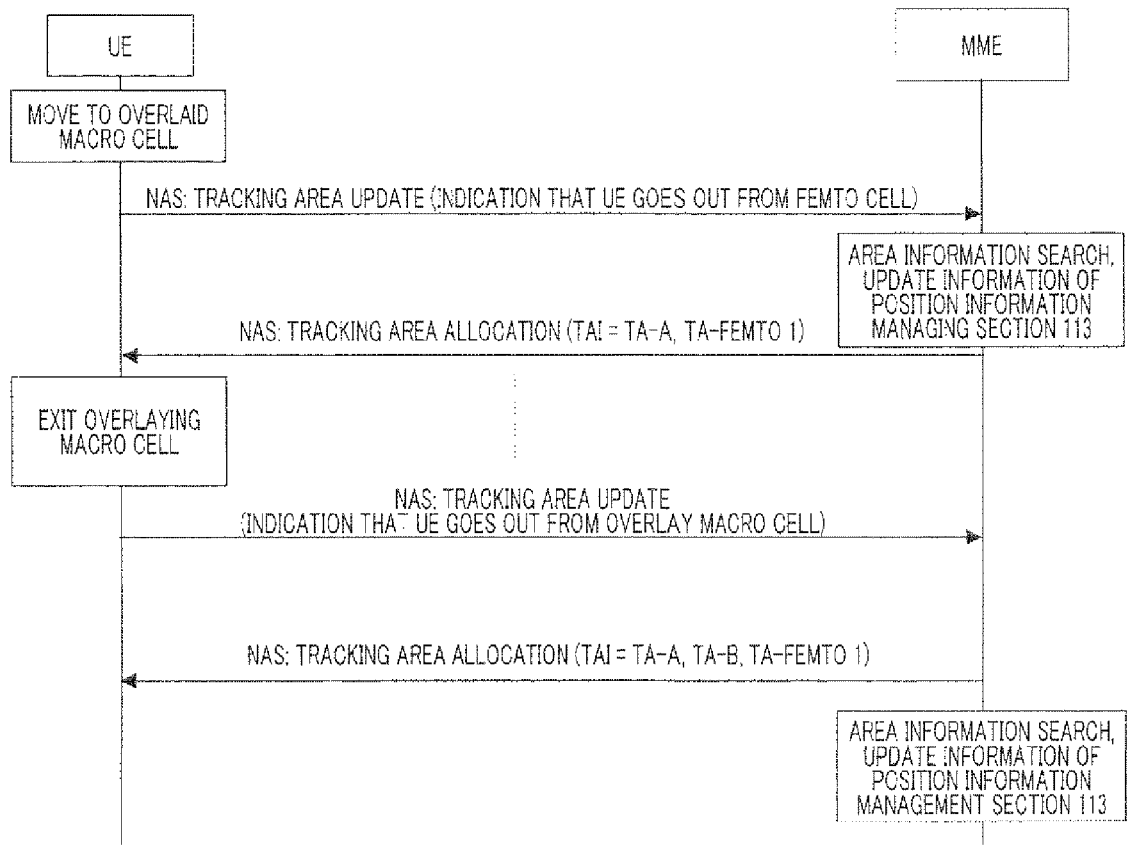
FIG. 33 is a sequence diagram illustrating procedures for stepwise switching from multi-TA registration to single-TA registration.

On the other hand, FIG. 31 illustrates a case where UE 104, which has stayed in the femto cell, moves out of the area of the femto cell. As shown in FIG. 31, when UE 104 stays in femto cell 1, single-TA registration (TA-femto1) is adopted, but when UE 104 moves to macro cell 8 which overlaps with femto cell 1, TA-A which is the TAI of macro cell 8 is assigned in addition to TA-femto1. When UE 104 further continues to move and moves out of the area of femto cell 8, the TAI (TA-B) of tracking area B, which is the peripheral tracking area of tracking area A, is assigned. FIG. 32 and FIG. 33 illustrate steps of a series of procedures.

Thus, according to Embodiment 8, by switching from multi-TA registration to single-TA registration stepwise, when the UE is located in a macro cell peripheral to the femto cell, it is possible to further reduce unnecessary paging messages to a plurality of peripheral macro cells, reduce the load on the UE and MME, reduce UE power consumption and reduce the load caused on the whole system by paging.

(Embodiment 9)

Figure 34:
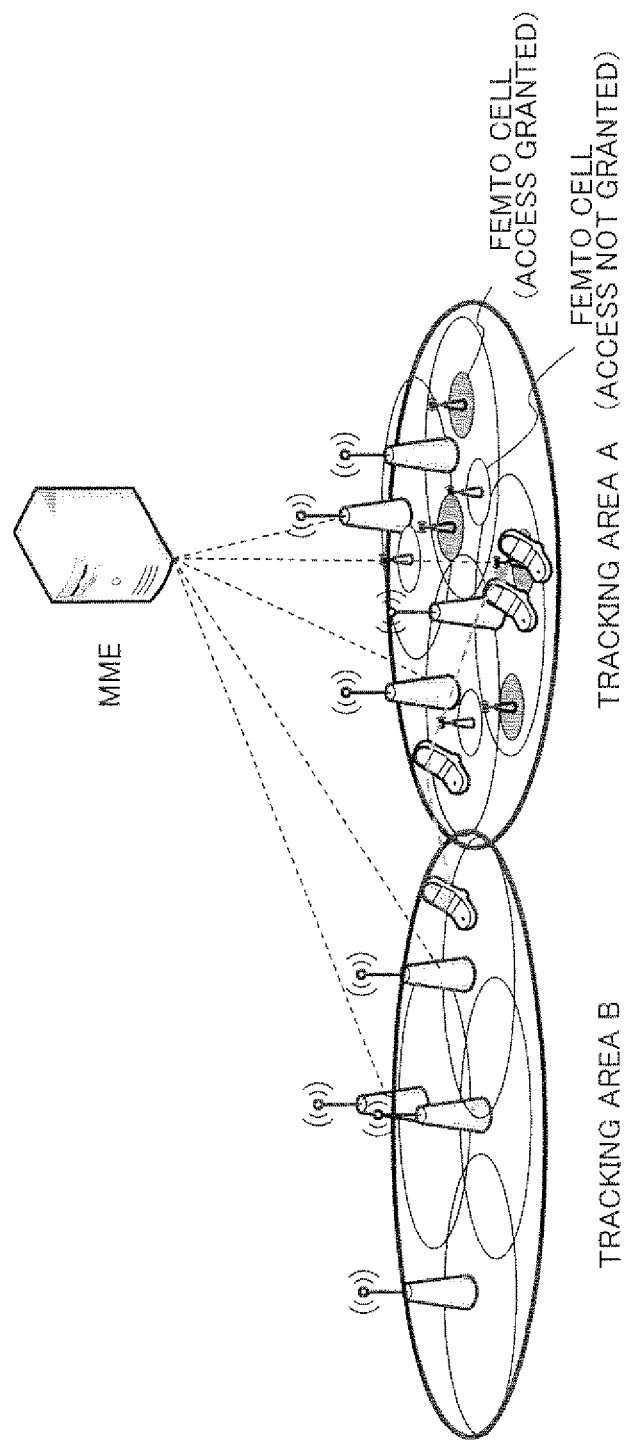
FIG. 34 is a diagram illustrating a configuration of a mobile communication system according to Embodiment 9 of the present invention.

Embodiments 1 to 8 have described the case where there is one femto cell to which the UE is granted access in the tracking area of the macro cell including that femto cell, and Embodiment 9 of the present invention will describe a case where there are a plurality of femto cells to which the UE is granted access in the tracking area of the macro cell including the above-described femto cell as shown in FIG. 34. Configurations of an MME, node B and UE according to Embodiment 9 of the present invention are the same as those of Embodiment 1 shown in FIGS. 5 to 7, and therefore the configurations thereof will be described using FIGS. 5 to 7.

Figure 35:
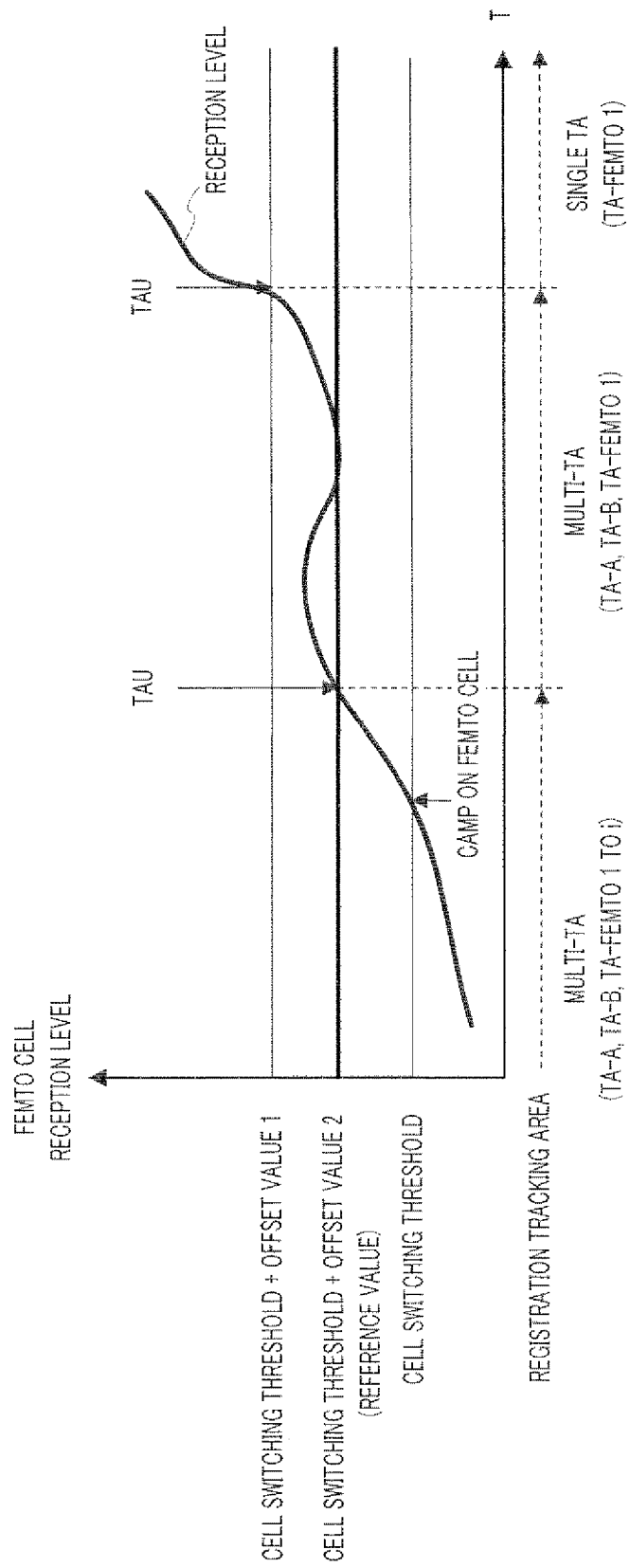
FIG. 35 is a diagram illustrating a change in the reception level of a signal from a femto cell at the UE.

FIG. 35 illustrates a variation in the reception level of a signal from the femto cell at the UE. FIG. 35 illustrates a new reference value (cell switching threshold+offset value 2) between a cell switching threshold at which switching between the macro cell and femto cell is performed as described in Embodiment 1 and a threshold (cell switching threshold+offset value 1) at which switching to single-TA registration is performed.

When the reception level of a signal from the connecting femto cell exceeds this reference value (cell switching threshold+offset value 2), UE 104 performs TAU and requests MME 101 to delete tracking area registration of femto cells other than the connecting femto cell.

Here, in the case where the reception level in the femto cell exceeds cell switching threshold+offset value 2 instead of a case where the connection destination is switched from the macro cell to the femto cell, the effect of deleting TA registration of other unconnected femto cells will be described. When UE 104 moves close to the femto cell, the reception level thereof exceeds the cell switching threshold and the connection destination is thereby switched to the femto cell. After that, a case is sufficiently conceivable where UE 104 may move to another femto cell and when the connection destination is switched from the macro cell to the femto cell, if TA registration of the other unconnected femto cell is deleted, and if UE 104 is connected to the other femto cell, since the TA registration of the femto cell has already been deleted, TAU needs to be performed again.

However, according to the present embodiment, when the reception level in the femto cell does not exceed the reference value, TA registration of the other unconnected femto cell is not deleted, and therefore even when UE 104 moves to the other femto cell, frequent TAU can be reduced. Furthermore, when the reception level in the femto cell exceeds the reference value, by deleting TA registration of the other unconnected femto cell, it is possible to minimize unnecessary paging messages to the other unconnected femto cell.

Figure 36:
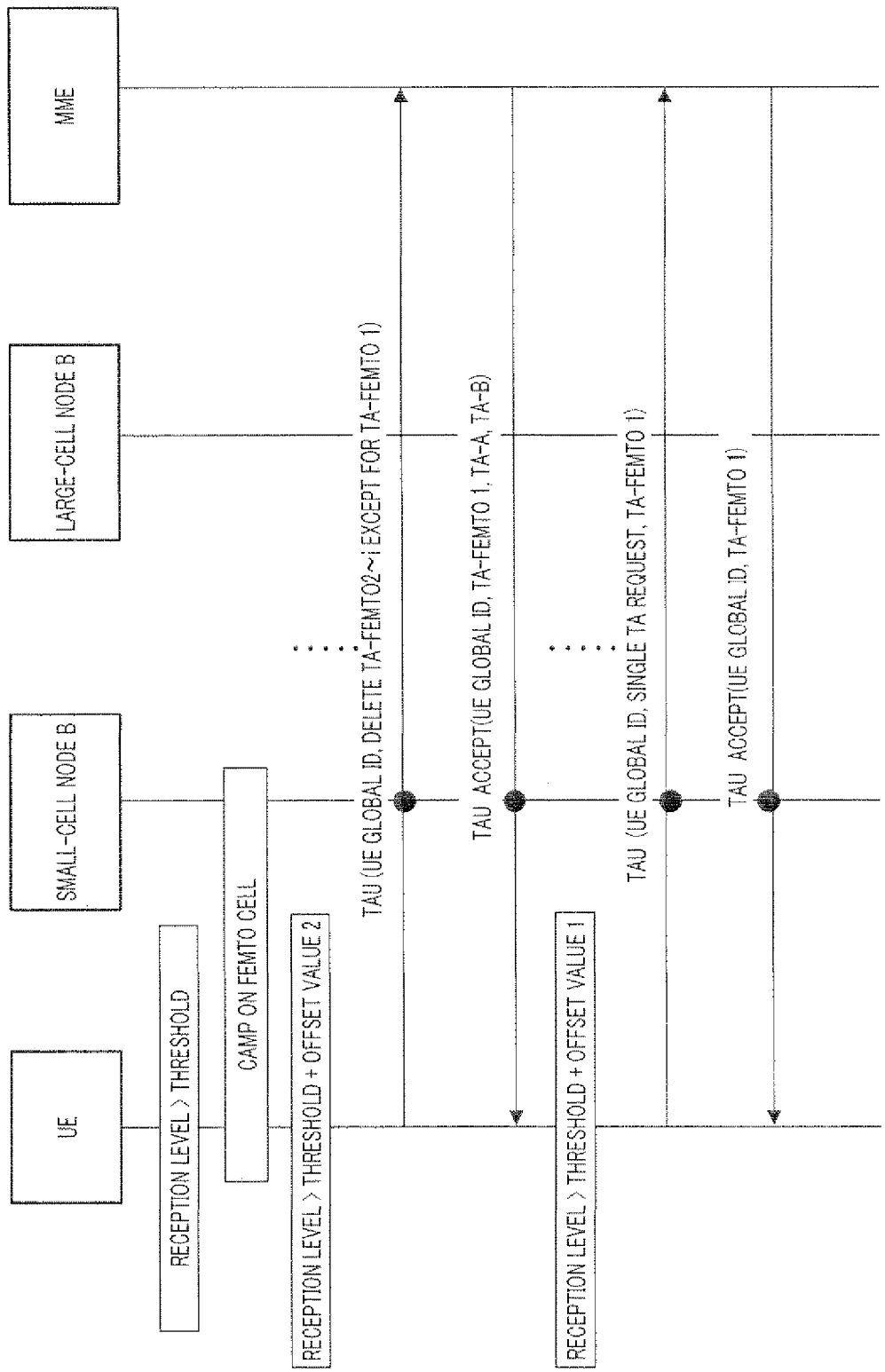
FIG. 36 is a sequence diagram illustrating procedural steps of TAU procedures for connection switching to a femto cell, deleting TA registration of an unconnected femto cell and changing a connecting femto cell to single-TA registration.

FIG. 36 illustrates procedural steps of TAU procedures for switching of connection to the femto cell, deletion of TA registration of the unconnected femto cell and switch to single-TA registration of the connecting femto cell.

Thus, according to Embodiment 9, by providing a reference value between a cell switching threshold at which switching between the macro cell and femto cell is performed and a threshold at which switching to single-TA registration is performed and controlling the deletion of TA registration of other unconnected femto cells depending on whether or not the reception level in the femto cell exceeds the reference value, it is possible to reduce TAU and reduce unnecessary paging messages. This makes it possible to reduce the load on the UE and MME, reduce UE power consumption and reduce the load caused on the whole system by paging.

When the reception level of the connecting femto cell exceeds a reference value, unnecessary paging can further be reduced by deleting also registration other than TA registration of the macro cell overlaying on the connecting femto cell, that is, TA-B in FIG. 4 in addition to TA registration of other unconnected femto cells.

(Embodiment 10)

Figure 37:
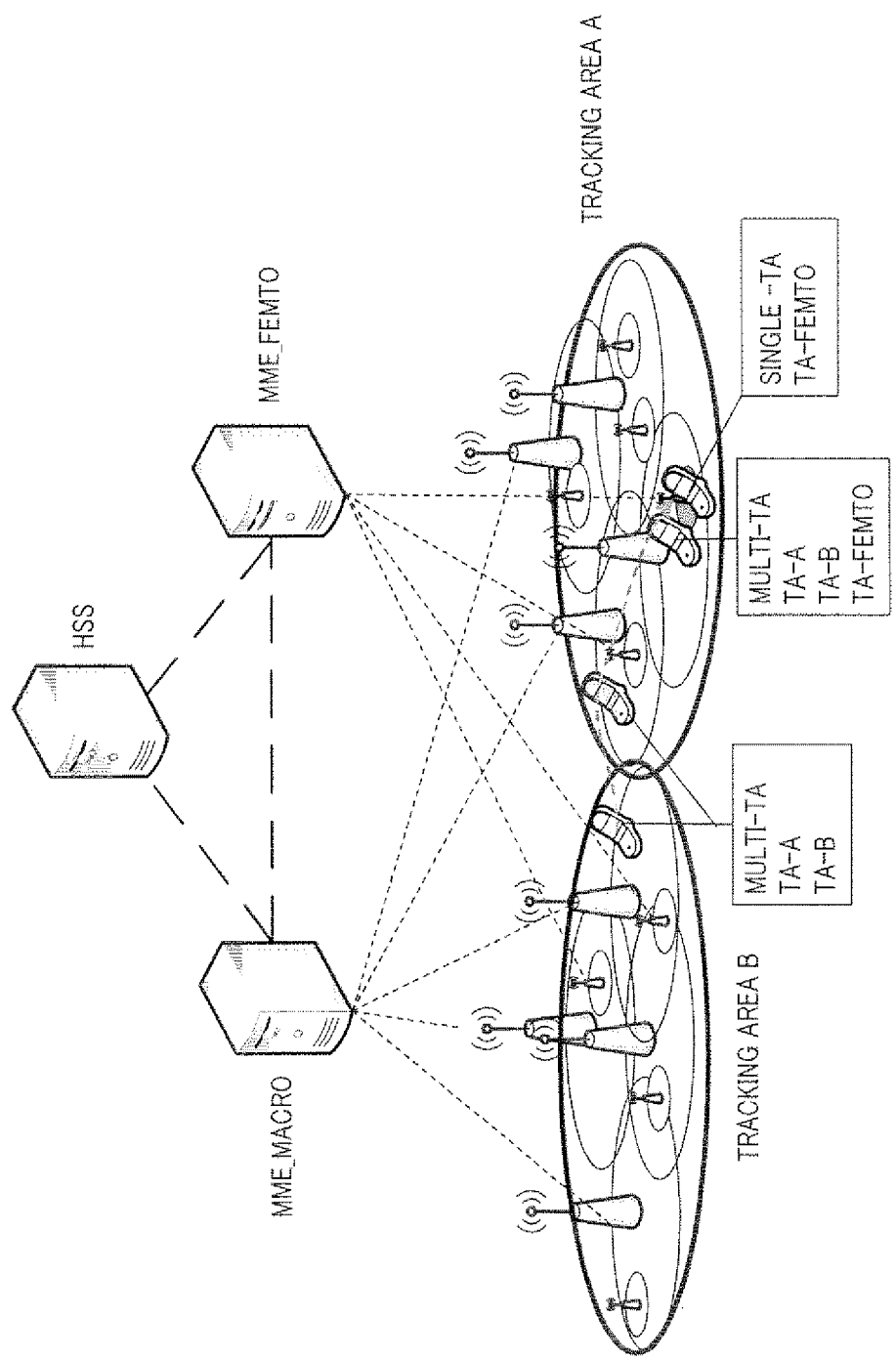
FIG. 37 is a diagram illustrating a configuration of a mobile communication system according to Embodiment 10 of the present invention.

Embodiments 1 to 9 have described the case where the same MME manages the macro cell and femto cell, but Embodiment 10 of the present invention will describe a case where different MMEs manage the femto cell and macro cell as shown in FIG. 37. Configurations of an MME, node B and UE according to Embodiment 10 of the present invention are the same as those of Embodiment 1 shown in FIGS. 5 to 7, and therefore the configurations thereof will be described using FIGS. 5 to 7. However, in FIG. 37, since signaling occurs between MMEs, an HSS (Home Subscriber Server) will be additionally described as an apparatus that recognizes under which MME management the UE exists.

In FIG. 37, when UE 104 moves between macro cells, multi-TA registration is performed to avoid frequent TAU which occurs when UE 104 crosses the tracking area boundary. That is, the terminal located in tracking area B shown in FIG. 37 has already registered tracking area A, and therefore when the terminal moves from tracking area B to tracking area A, the terminal may need not perform TAU. Alternatively, upon entering tracking area A, the terminal may perform TAU and may register tracking areas A and B.

Here, according to the present embodiment, since different MMEs manage femto cells and macro cells, the MME that manages macro cells (hereinafter referred to as "MME_macro") does not recognize the tracking area of each femto cell, and when each UE moves to the tracking area of a macro cell on which a femto cell accessible to each UE overlays as shown in Embodiment 1, multi-TA registration whereby the TAI of the femto cell is assigned, is not performed.

Figure 38:
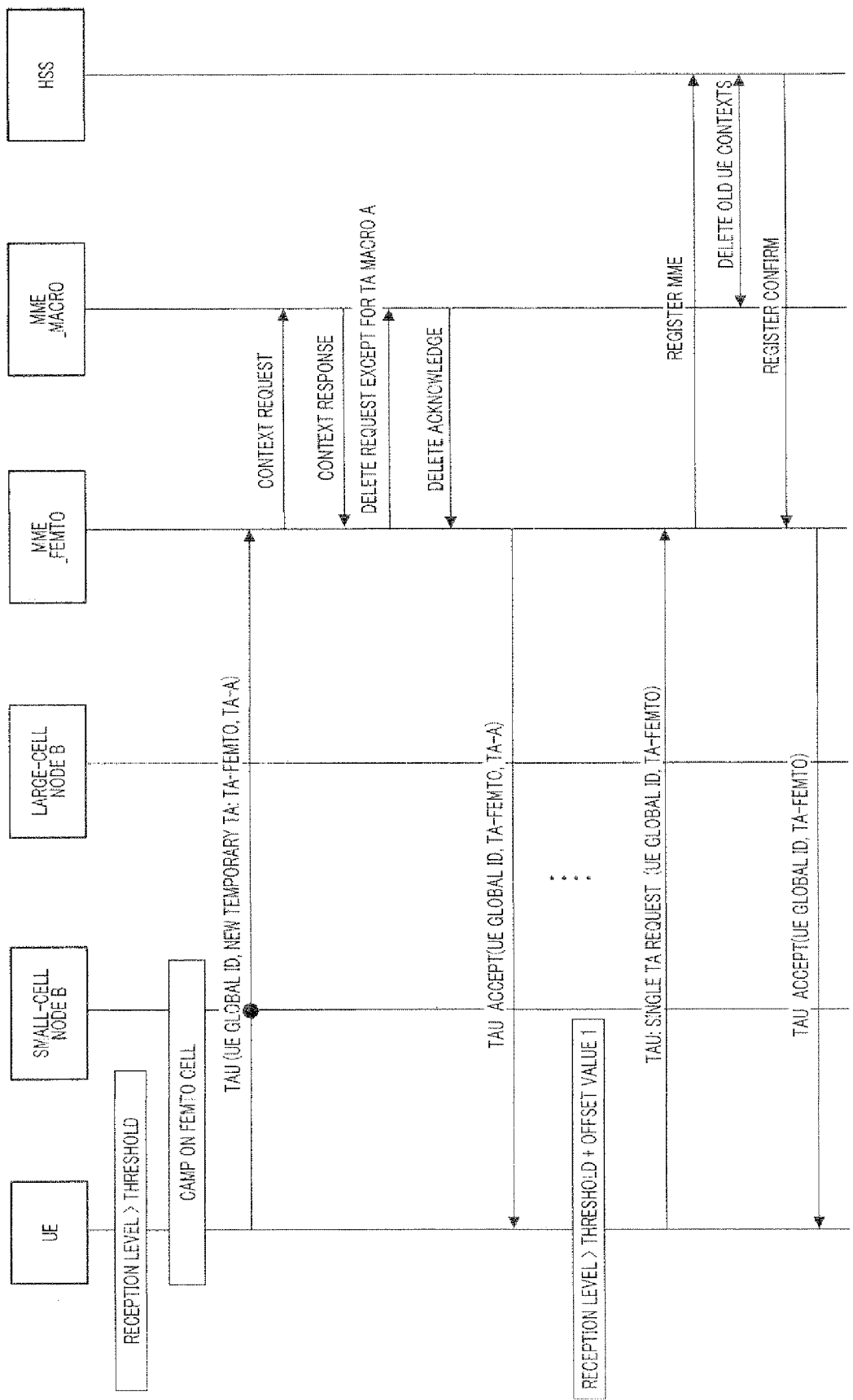
FIG. 38 is a sequence diagram illustrating procedural steps in procedures for switching from multi-TA registration to single-TA registration according to Embodiment 10.

Then, the UE detects an accessible femto cell in tracking area A of the macro cell, performs multi-TA registration of the tracking area of the femto cell and the tracking area of the macro cell, and, eventually, the UP comes to single-TA registration of only the tracking area of the femto cell. FIG. 38 illustrates these steps.

UE 104, which has detected an accessible femto cell in tracking area A of a macro cell, performs TAU. The MME, which manages the femto cell that has received TAU (hereinafter referred to as "MME_femto") understands from an old TAI included in the TAU signal, that is, TAI (TA-A) of a peripheral macro cell, that the tracking area is not the tracking area managed by the MME and identifies MME_macro that manages the tracking area. The MME_macro can also be identified from ID information of the MME included in UE Global ID included in TAU. The MME_femto then requests the MME_macro for context information of UE 104 (context request).

The MME registered with the HSS at this point in time is the MME_macro and the MME_macro registers a proxy function for the MME_femto as context information of UE 104 so that a paging message is also transmitted from the femto cell connected via the MME_femto. In this way, the destination of the paging message becomes the tracking area of a peripheral macro cell and the tracking area of the femto cell.

The MME_macro, which has received the request, responds context information (IMSI, authentication information, bearer information or the like) of UE 104 to the MME_femto (context response). Furthermore, to erase the tracking area of the macro cell registered other than the tracking area of the macro cell (TA-A) overlaying on the connecting femto cell, TA-B, here from the registration, the MME_femto requests an erasure of TA registration registered with the MME_macro other than TA-A sent by TAU (delete request). This request together with TAI (TA-A) whose TA registration is kept is reported to the MME_macro.

If there is a registered tracking area other than the tracking area sent, the MME_macro, which has received the request, deletes the TA thereof from UE position information managing section 113 and responds a confirmation signal (delete acknowledge) to the MME_femto. Context request and delete request can also be sent by the same message.

Thus, the MME_femto, which has completed signaling to/from the MME_macro, registers TA-femto which is a new TAI in own UE position information managing section 113 and sends TAU accept which is a response to TAU by including TAI (TA-femto) of the femto cell managed by the MME_femto and TAI (TA-A) of the overlaying macro cell confirmed by the MME_macro to UE 104 via a small-cell node B. UE 104 stores TA-femto and TA-A included in received TAU accept in position information managing section 145.

Thus, signaling is exchanged between the MME_femto and MME_macro and, if there is TA registration other than the tracking area of the macro cell on which the currently connecting femto cell overlays, the MME_macro deletes the TA registration, and it is thereby possible to delete unnecessary paging messages.

Next, switching of the tracking area of the femto cell to single-TA registration will be described. In the same way as Embodiment 1, when the reception level exceeds a value obtained by adding an offset value to a cell switching threshold for switching to the femto cell, UE 104 performs TAU and requests the MME_femto for switching to single-TA registration.

As shown in FIG. 38, the MME_femto, which has received a request of single-TA registration (TAU: Single TA request), sends an MME registration request (MME register) to the HSS and requests the HSS for registration as the MME that manages UE 104. Next, the HSS, which has received the MME registration request, deletes the registration of the MME_macro registered so far and sends a request signal for deleting the context information of UE 104 to the MME_macro.

The MME_macro, which has received the deletion request, deletes context information of all UEs including the tracking area information of the UEs managed by UE position information managing section 113 and the UEs are thereby excluded from management. Hereinafter, paging messages are reported only via the MME_femto. Finally, a TAU accept signal together with the UE Global ID assigned by MME_femto and TAI of the femto cell is sent to the UEs and single-TA registration is completed.

In the descriptions so far, as shown in Embodiment 1, TAU is performed and a switchover to single-TA registration is performed when the received signal level of the femto cell exceeds cell switching threshold+offset value 1, but it is also possible to eventually realize switching to single-TA registration using the method of switching to single-TA registration shown in Embodiments 2, 3 and 5.

Thus, according to Embodiment 10, when different MMEs manage a femto cell and a macro cell, signaling is exchanged between an MME_femto and an MME_macro at the time of TAU carried out when UE 104 moves to the femto cell and is connected, and if there is TA registration other than the tracking area of the macro cell on which the connecting femto cell overlays in the MME_macro, the TA registration is deleted, and it is thereby possible to avoid TAU that occurs when the UE crosses the boundary between the femto cell and the overlaying macro cell and delete unnecessary paging messages transmitted to the tracking area of the peripheral macro cell that does not overlay on the femto cell until single-TA registration is performed. This makes it possible to reduce loads on UE 104 and MME 101, reduce power consumption of UE 104 and reduce the load caused on the whole system by paging.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2007-227158, filed on Aug. 31, 2007 and Japanese Patent Application No. 2008-055329, filed on Mar. 5, 2008, including the specifications, drawings and abstracts, are incorporated herein by reference in their entirety.

Industrial Applicability

The radio communication terminal apparatus, radio communication base station apparatus and radio communication method according to the present invention can reduce paging load in mobile communication systems including a macro cell and femto cell and are applicable to a mobile communication system.

The invention claimed is:

1. A radio communication terminal apparatus comprising:
a determining section that determines whether or not a currently connecting radio communication base station apparatus is a femto cell base station; and
a radio transmitting/receiving section that transmits a position management area update request signal that requests a single tracking area registration when the currently connecting radio communication base station apparatus is determined to be the femto cell base station and a first call connection request signal is transmitted and transmits a position management area update request signal that requests a multi-tracking area registration when the currently connecting radio communication base station is determined not to be the femto cell base station.

2. The radio communication terminal apparatus according to claim 1, wherein the radio transmitting/receiving section transmits the position management area update request signal included in a call connection request signal.

3. The radio communication terminal apparatus according to claim 1, further comprising a reception level measuring section that measures a reception level of a signal transmitted from a radio communication base station apparatus,
wherein the radio transmitting/receiving section transmits the position management area update request signal according to the measured reception level.

* * * * *